(12) United States Patent
Iwamoto

(10) Patent No.: US 10,754,169 B2
(45) Date of Patent: Aug. 25, 2020

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 15/400,211

(22) Filed: Jan. 6, 2017

(65) Prior Publication Data
US 2017/0199356 A1 Jul. 13, 2017

(30) Foreign Application Priority Data

Jan. 8, 2016 (JP) ................................. 2016-002448

(51) Int. Cl.
*G02B 13/00* (2006.01)
*G02B 7/04* (2006.01)
(Continued)

(52) U.S. Cl.
CPC ............. *G02B 27/646* (2013.01); *G02B 9/34* (2013.01); *G02B 13/02* (2013.01)

(58) Field of Classification Search
CPC .... G02B 13/00; G02B 16/0045; G02B 13/18; G02B 7/04; G02B 7/10; G02B 27/64;
(Continued)

(56) References Cited

U.S. PATENT DOCUMENTS

| 5,402,268 A | * | 3/1995 | Tatsuno | ................. G02B 13/02 359/685 |
| 5,627,685 A | * | 5/1997 | Yamanashi | ............ G02B 13/02 359/745 |

(Continued)

FOREIGN PATENT DOCUMENTS

| JP | 2012234169 A | 11/2012 |
| JP | 2012-242504 A | 12/2012 |

(Continued)

OTHER PUBLICATIONS

English translation of JP 2014235177, machine translated on Dec. 4, 2018.*

(Continued)

*Primary Examiner* — Jie Lei
(74) *Attorney, Agent, or Firm* — Carter, DeLuca & Farrell LLP

(57) ABSTRACT

Provided is an optical system, including, in order from an object side to an image side: a first lens unit having a positive refractive power; a second lens unit having a positive refractive power; a third lens unit having a negative refractive power; and a fourth lens unit having a positive refractive power, in which the second lens unit is configured to move in an optical axis direction during focusing, in which the third lens unit is configured to move, during image blur correction, in a direction having a vertical direction component with respect to an optical axis, and in which a configuration of the first lens unit and arrangement of an aperture stop and the third lens unit are each appropriately set.

15 Claims, 28 Drawing Sheets

(51) Int. Cl.
  *G02B 27/64* (2006.01)
  *G02B 7/10* (2006.01)
  *G02B 9/34* (2006.01)
  *G02B 27/00* (2006.01)
  *G02B 13/02* (2006.01)

(58) Field of Classification Search
  CPC .. G02B 27/00; G02B 27/0025; G02B 27/646; G02B 9/34; G02B 15/14; G02B 13/02
  USPC ........ 359/779, 772, 754, 753, 747, 682, 686
  See application file for complete search history.

(56) References Cited

U.S. PATENT DOCUMENTS

| | | | |
|---|---|---|---|
| 9,217,851 B2 | 12/2015 | Iwamoto | |
| 2004/0196574 A1* | 10/2004 | Tanaka | G02B 15/163 359/779 |
| 2010/0238560 A1* | 9/2010 | Fujimoto | G02B 15/177 359/682 |
| 2012/0293877 A1* | 11/2012 | Watanabe | G02B 13/02 359/715 |
| 2014/0055659 A1 | 2/2014 | Iwamoto | |
| 2014/0098277 A1* | 4/2014 | Nagamatsu | G02B 17/0804 348/335 |

FOREIGN PATENT DOCUMENTS

| JP | 2014-074783 A | 4/2014 |
|---|---|---|
| JP | 2014-235177 A | 12/2014 |

OTHER PUBLICATIONS

English translation of JP 2012234160, machine translated on Feb. 20, 2020.*
Japanese Office Action for application No. 2016002448 dated Nov. 12, 2019 with English translation.

* cited by examiner

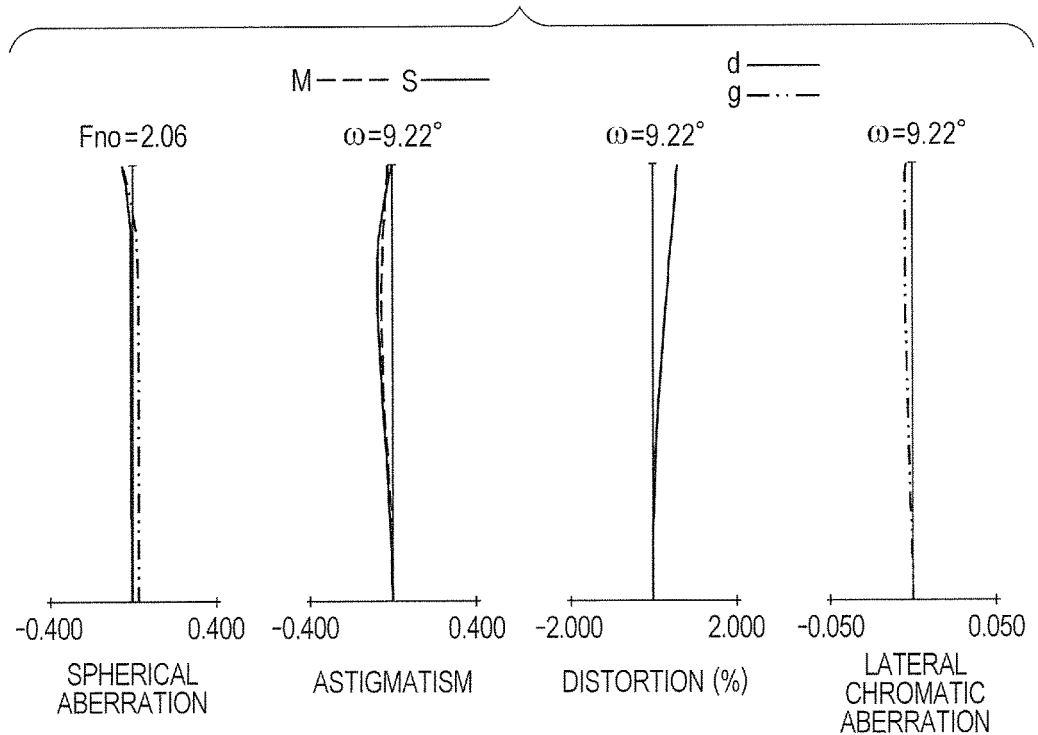
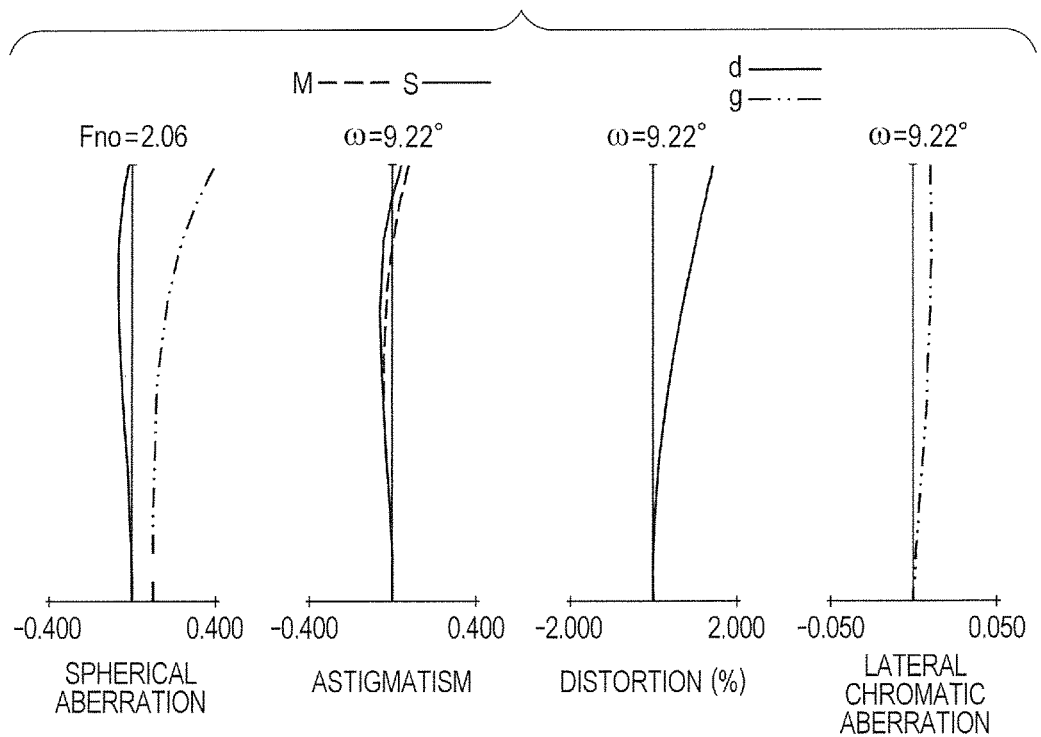

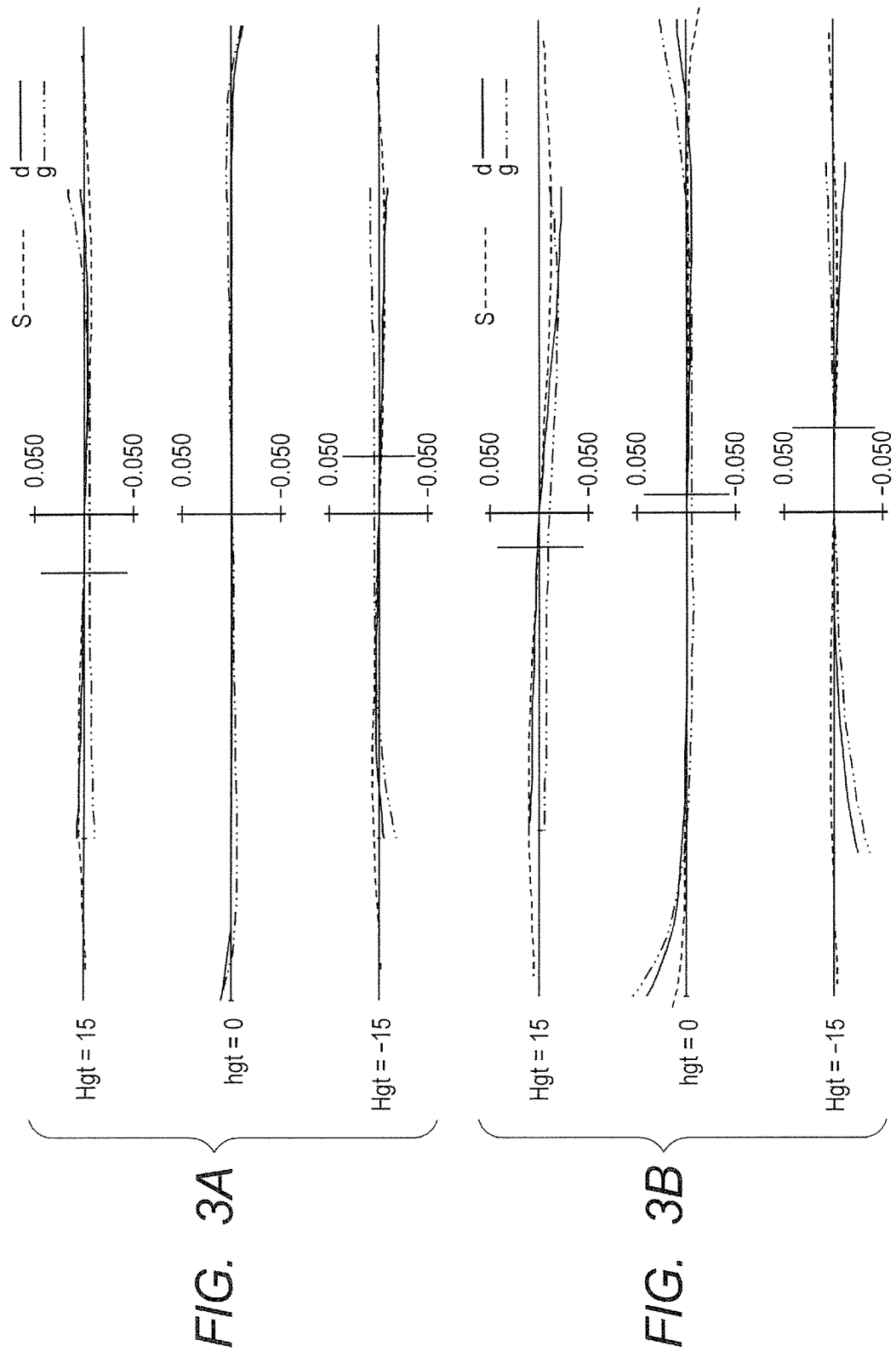

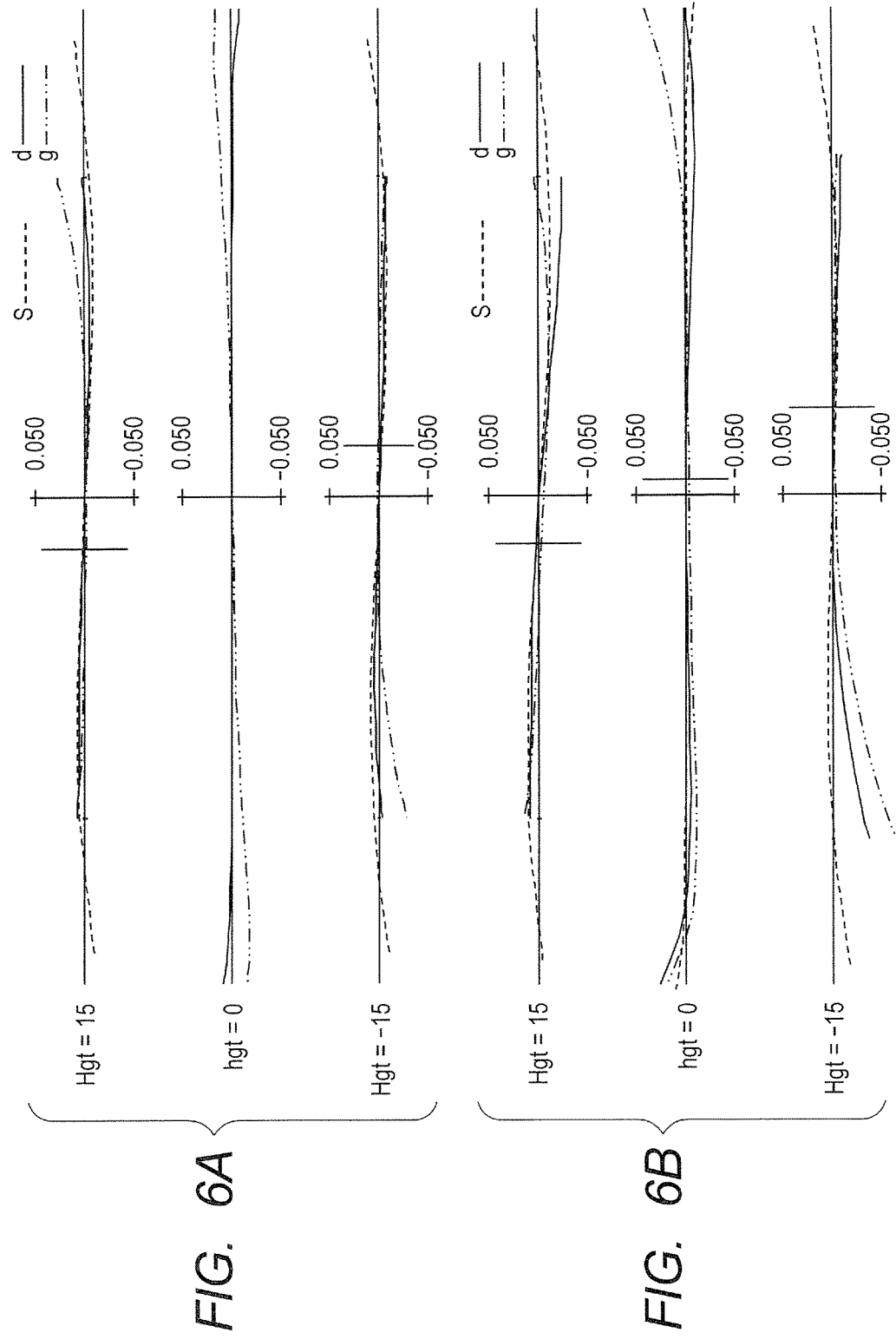

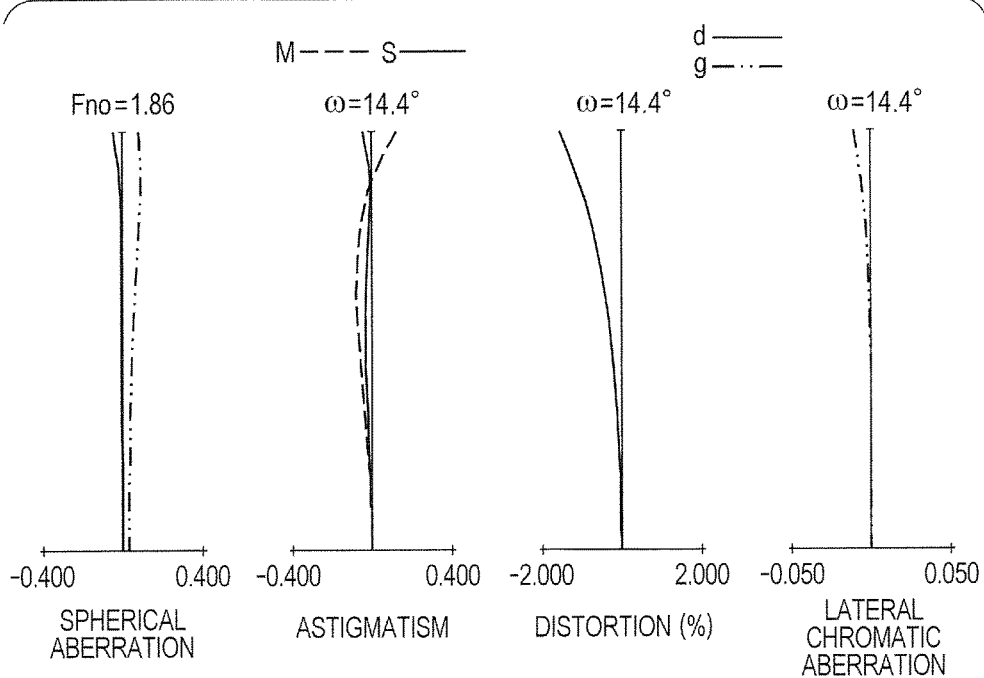
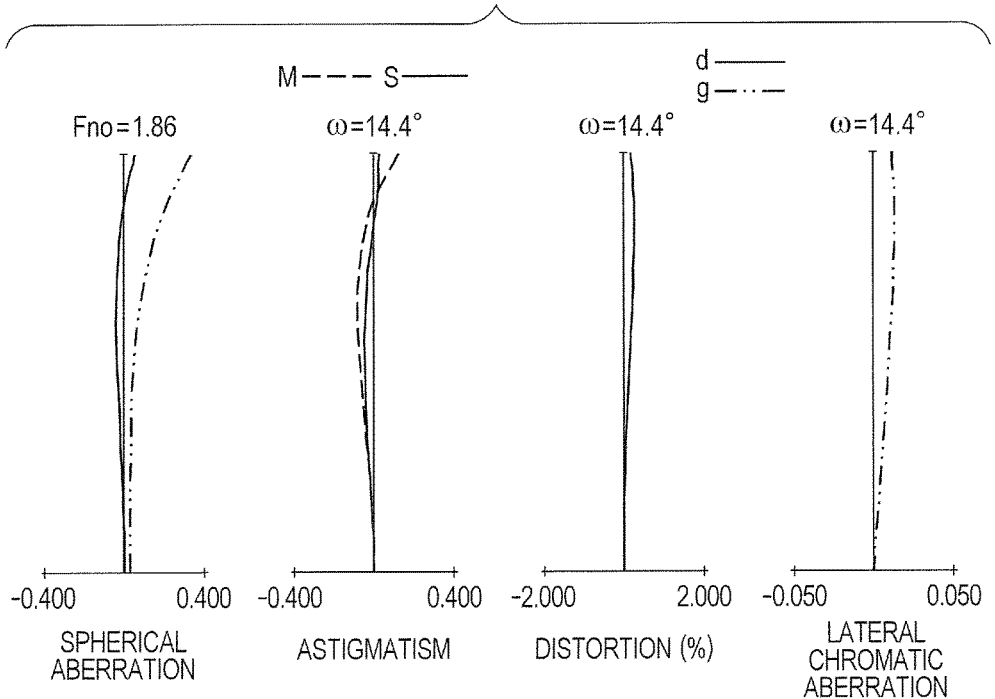

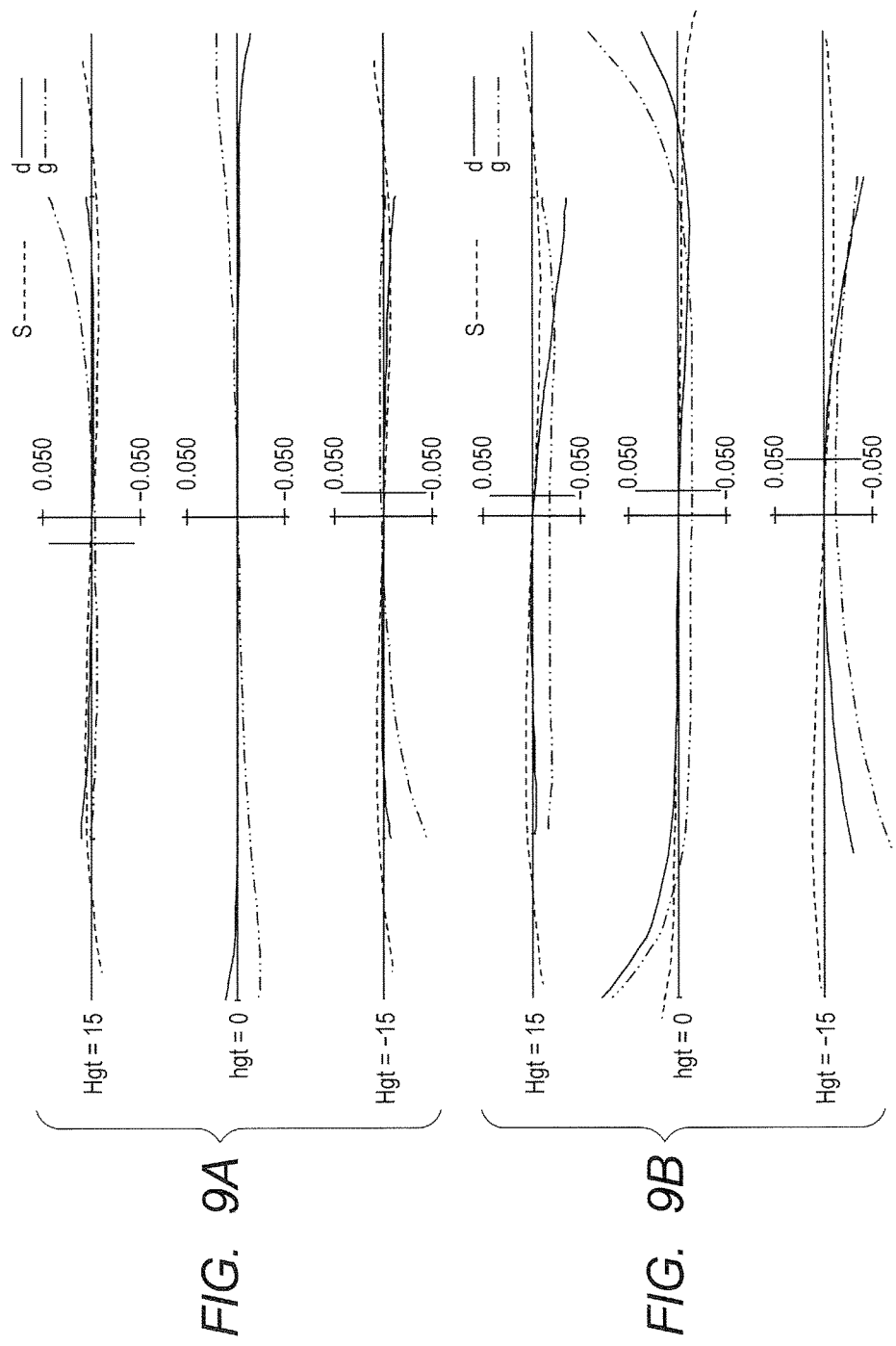

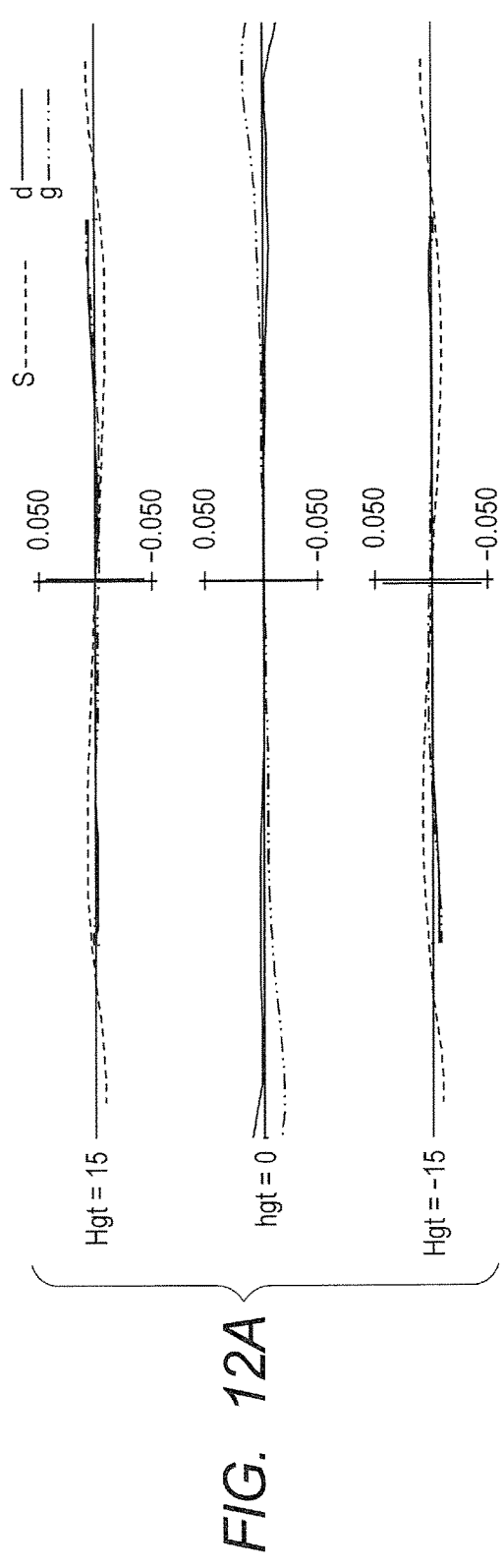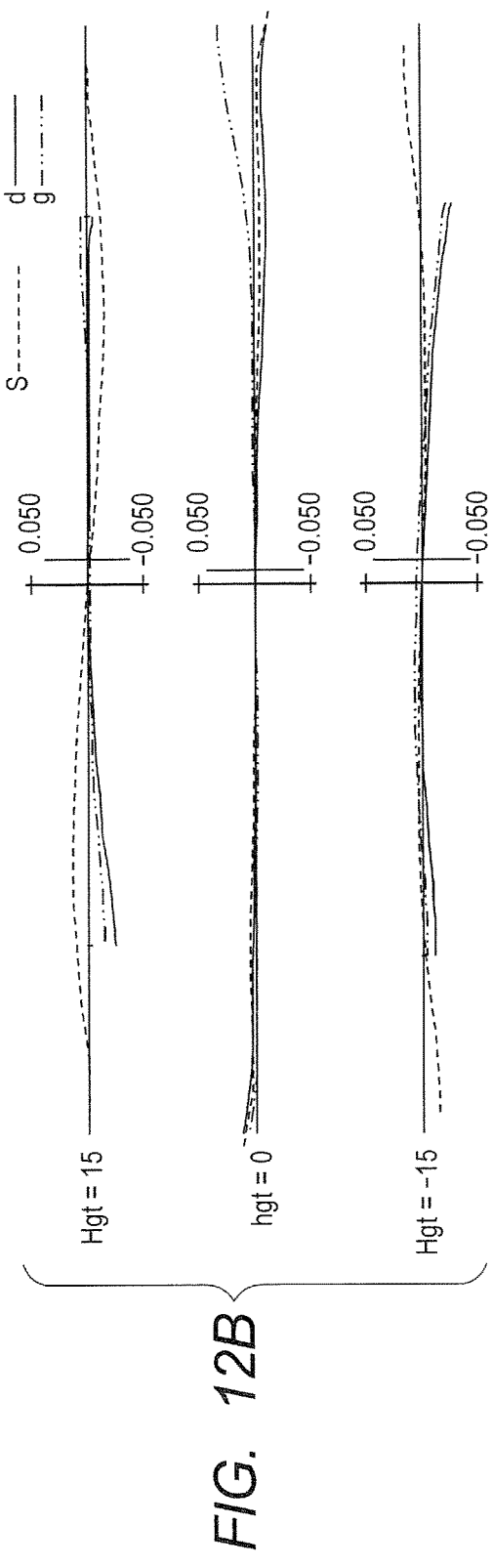
FIG. 12A
FIG. 12B

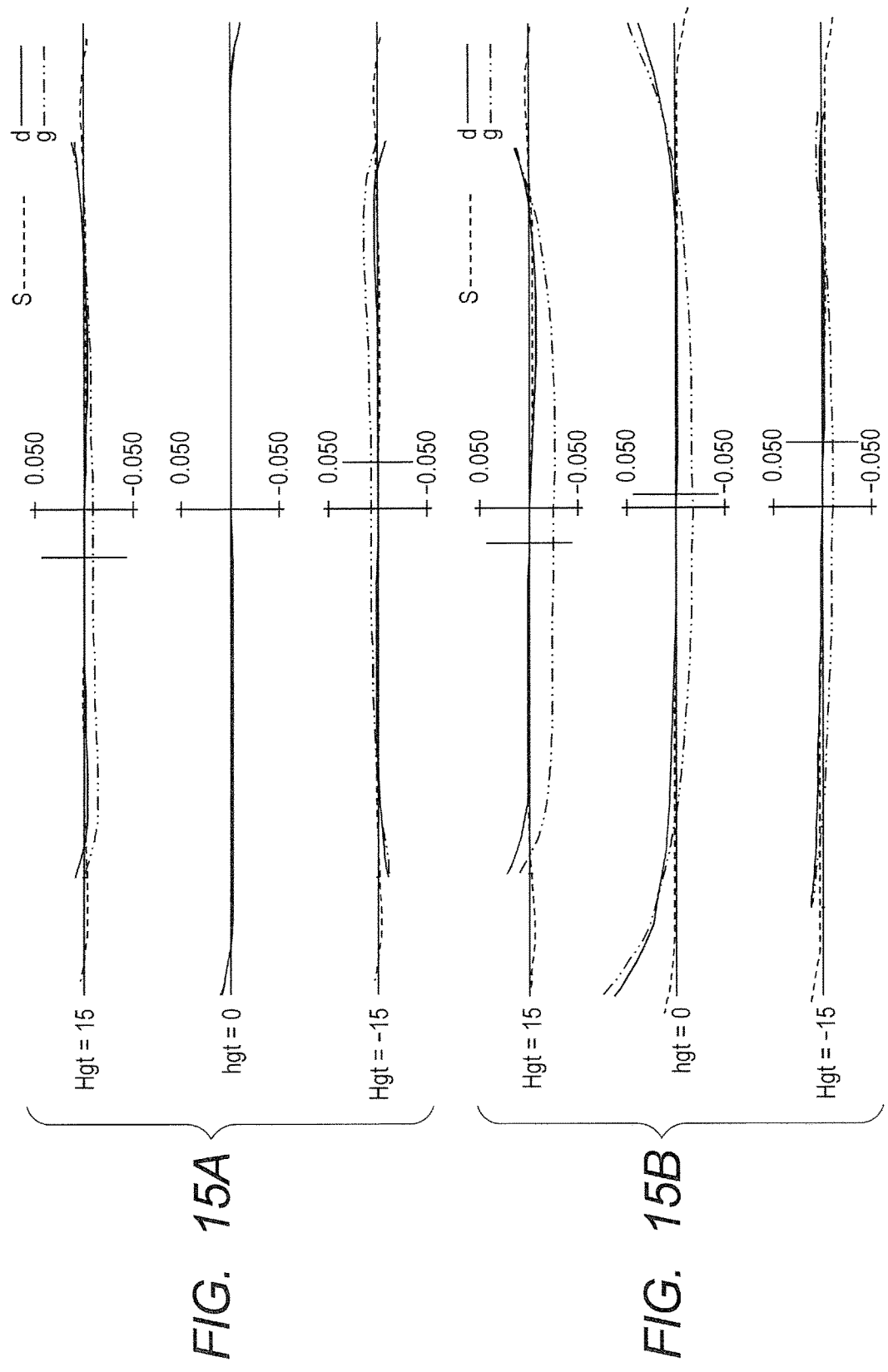

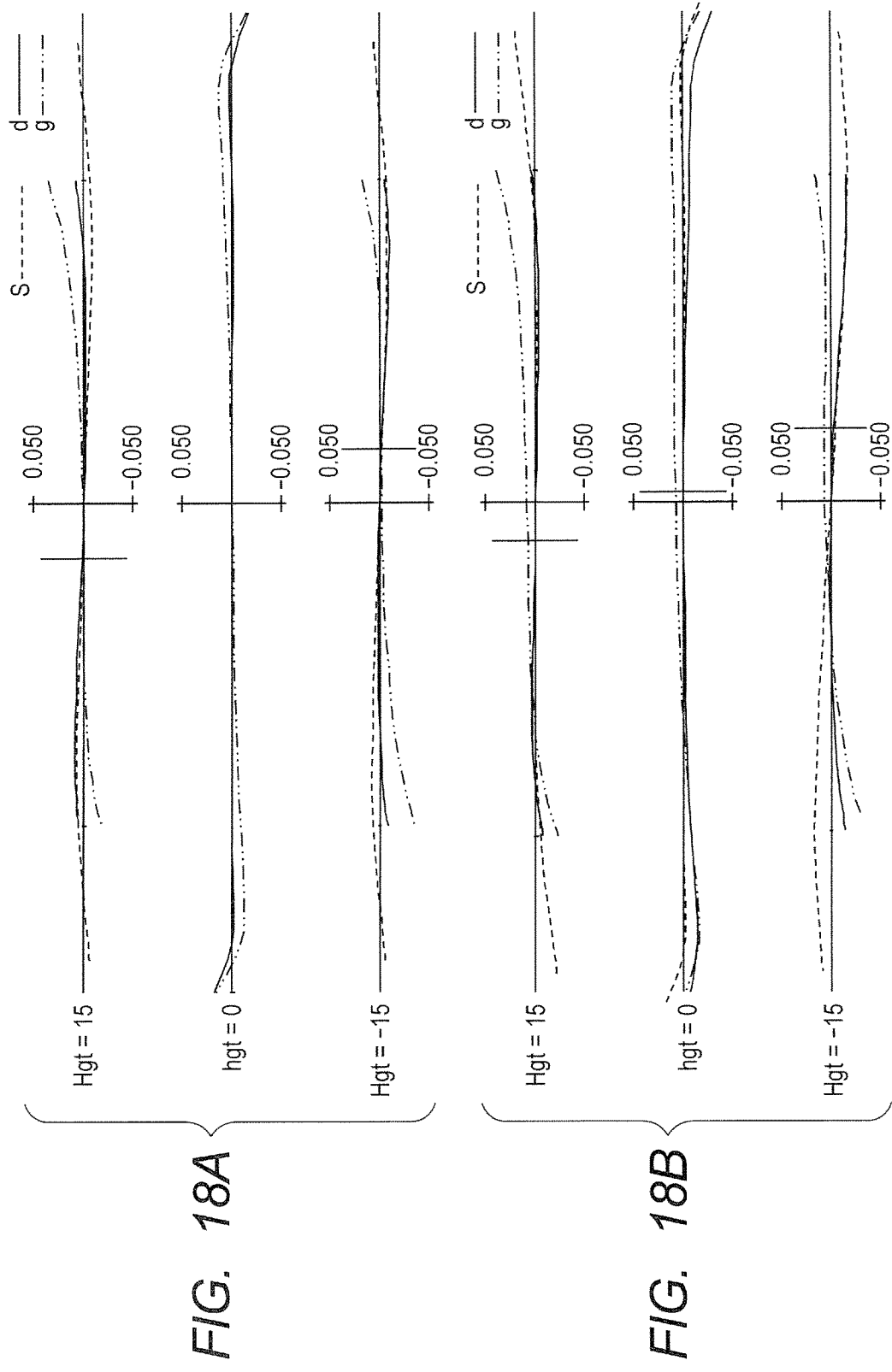

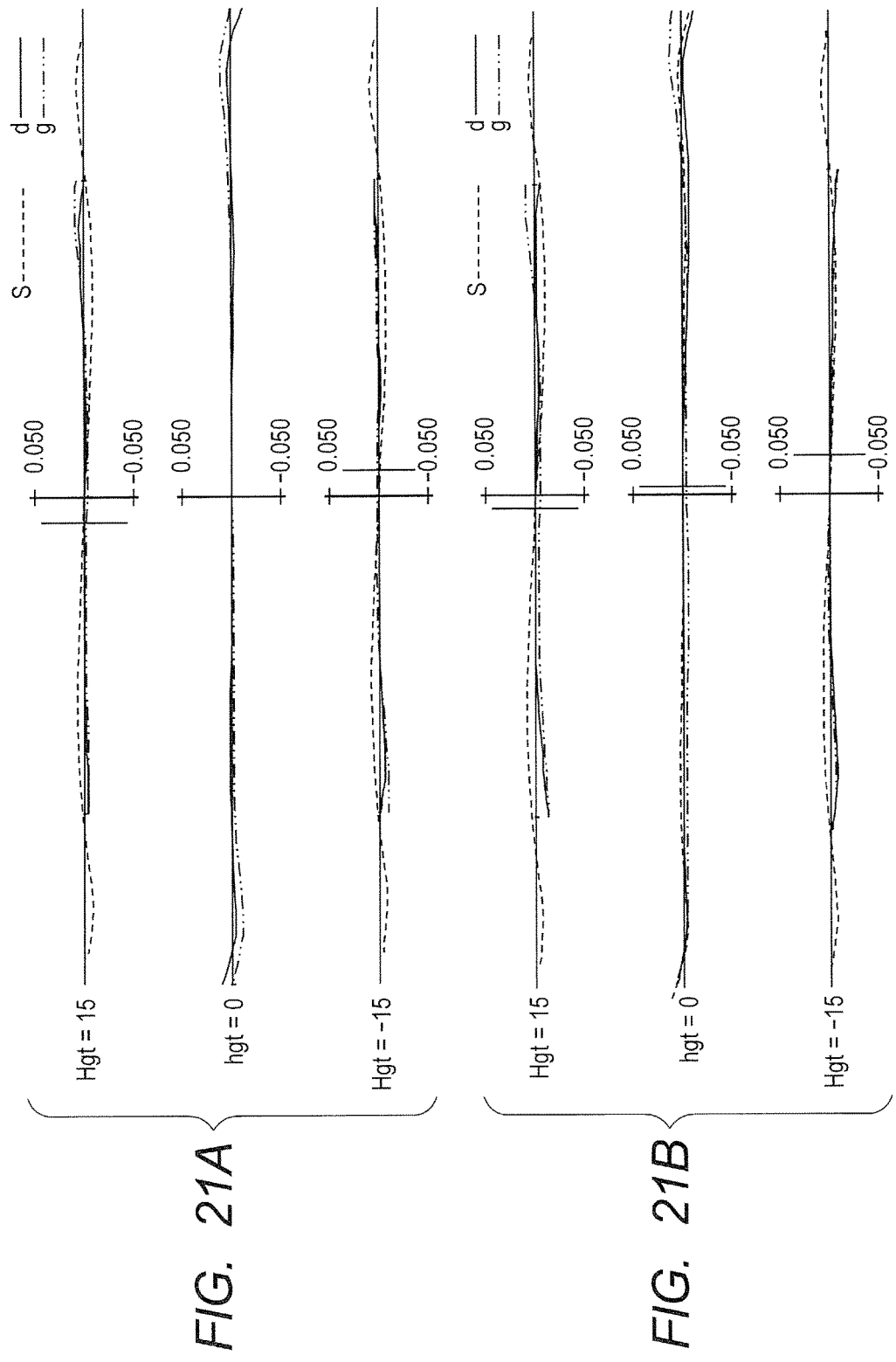

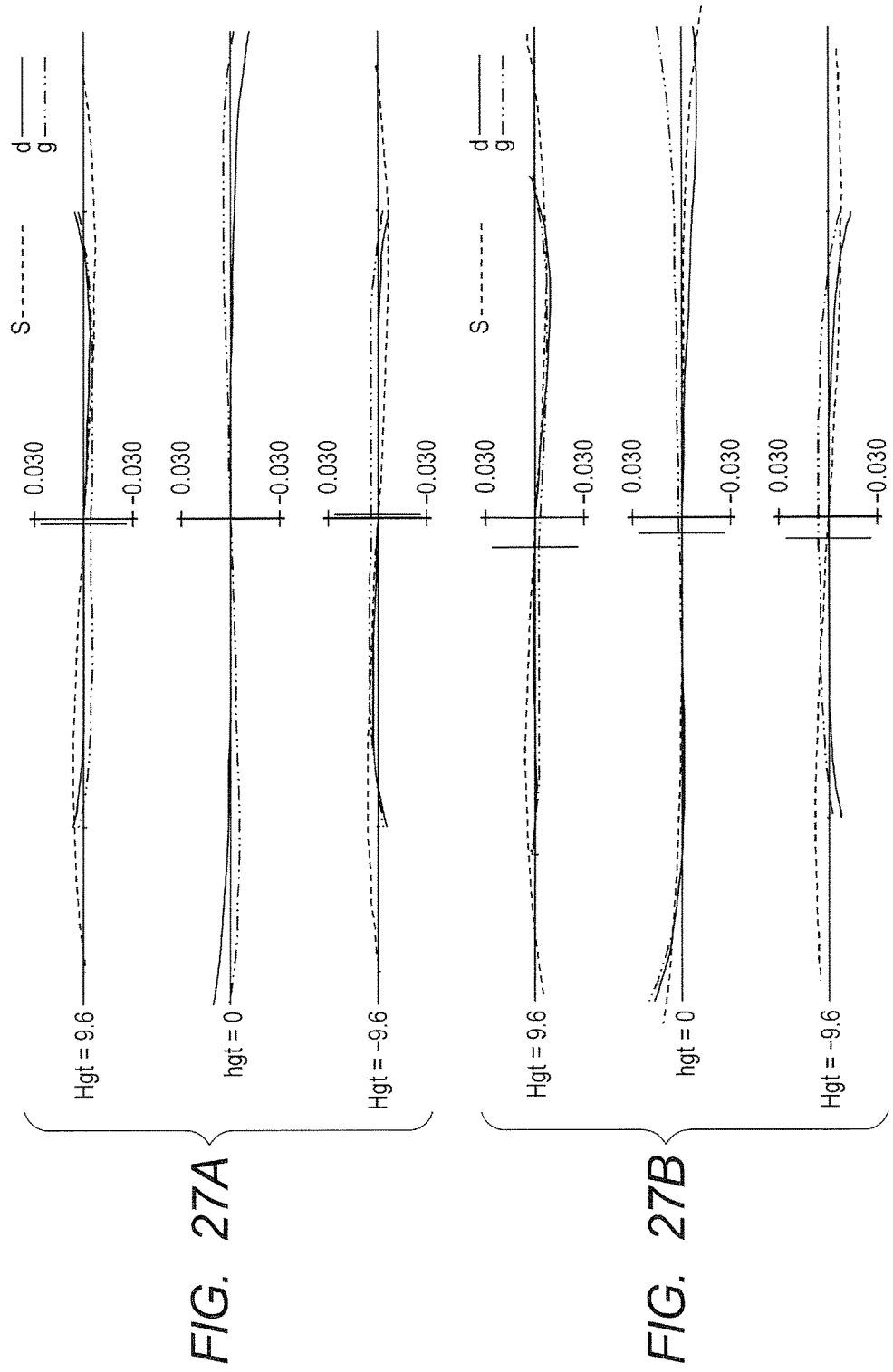

OPTICAL SYSTEM AND IMAGE PICKUP APPARATUS INCLUDING THE SAME

BACKGROUND OF THE INVENTION

Field of the Invention

The present invention relates to an optical system and an image pickup apparatus including the same, which are suitable for, for example, an image pickup optical system for a digital still camera, a digital video camera, a television (TV) camera, a monitoring camera, a silver-halide camera, or the like.

Description of the Related Art

As an image pickup optical system to be used in an image pickup apparatus such as a digital camera or a video camera, there has been known an image pickup optical system having a long focal length and a large aperture. There is a strong demand for the image pickup optical system to have high optical characteristics, even though a total lens length thereof is short and an entire system thereof is compact. Also demanded to the image pickup optical system is being capable of achieving high-speed focusing operation.

Hitherto, as a focusing type, there has been known an inner focus type in which a light-weight lens unit positioned inside an image pickup optical system is configured to move for focusing. Further, there is a need for image pickup optical systems having a long focal length to have an image stabilization function for correcting a blur of a taken image because such image pickup optical systems are easily affected by camera shake.

Hitherto, as a method of correcting a blur of a taken image, there has been known a configuration in which a part of lens units of an image pickup optical system is configured to move in a direction having a vertical direction component with respect to an optical axis such that an imaging position is moved to the vertical direction with respect to the optical axis.

In each of Japanese Patent Application Laid-Open No. 2012-242504 and Japanese Patent Application Laid-Open No. 2014-74783, there is disclosed an image pickup optical system that includes an inner focus type focusing mechanism, and further has an image stabilization function.

In an image pickup optical system including an inner focus type focusing mechanism, aberration deviation tends to increase during focusing. Further, in an image pickup optical system employing an image blur correction method in which a part of lens units is used as an image stabilization lens unit, decentering aberrations tend to be generated by a large amount during image stabilization.

Thus, it is important to arrange a focusing lens unit and an image stabilization lens unit at appropriate positions.

SUMMARY OF THE INVENTION

It is an object of the present invention to provide an optical system capable of performing focusing with a small and light-weight lens unit and image stabilization with a small and light-weight lens unit, in which satisfactory optical characteristics are easily maintained during focusing and image stabilization.

According to one embodiment of the present invention, there is provided an optical system, including, in order from an object side to an image side:

a first lens unit having a positive refractive power;
a second lens unit having a positive refractive power;
a third lens unit having a negative refractive power; and
a fourth lens unit having a positive refractive power, in which the second lens unit is configured to move in an optical axis direction during focusing, in which the third lens unit is configured to move, during image blur correction, in a direction having a vertical direction component with respect to an optical axis, in which the first lens unit is composed of five or less lens elements, in which the optical system further includes an aperture stop between the second lens unit and the third lens unit, and in which the following conditional expression is satisfied:

$$0.30 < D3/f < 1.30,$$

where D3 represents a distance on the optical axis from a lens surface closest to the object side of the third lens unit to an image plane, and f represents a focal length of the optical system.

Further features of the present invention will become apparent from the following description of exemplary embodiments with reference to the attached drawings.

BRIEF DESCRIPTION OF THE DRAWINGS

FIG. 2A is a longitudinal aberration diagram of the optical system of Embodiment 1 when focusing on an infinity object.

FIG. 2B is a longitudinal aberration diagram of the optical system of Embodiment 1 in a focus state where an imaging magnification is −0.20.

FIG. 3A and FIG. 3B are lateral aberration diagrams of the optical system of Embodiment 1, in which FIG. 3A is illustrations of a reference state when focusing on the infinity object and FIG. 3B is illustrations when an image blur on an image plane of 0.5° is corrected (image stabilization is performed).

FIG. 6A and FIG. 6B are lateral aberration diagrams of the optical system of Embodiment 2, in which FIG. 6A is illustrations of a reference state when focusing on the infinity object and FIG. 6B is illustrations when an image blur on an image plane of 0.5° is corrected (image stabilization is performed).

FIG. 8A is a longitudinal aberration diagram of the optical system of Embodiment 3 when focusing on the infinity object.

FIG. 8B is a longitudinal aberration diagram of the optical system of Embodiment 3 in a focus state where an imaging magnification is −0.12.

FIG. 9A and FIG. 9B are lateral aberration diagrams of the optical system of Embodiment 3, in which FIG. 9A is illustrations of a reference state when focusing on the infinity object and FIG. 9B is illustrations when an image blur on an image plane of 0.5° is corrected (image stabilization is performed).

FIG. 12A and FIG. 12B are lateral aberration diagrams of the optical system of Embodiment 4, in which FIG. 12A is illustrations of a reference state when focusing on the infinity object and FIG. 12B is illustrations when an image blur on an image plane of 0.5° is corrected (image stabilization is performed).

FIG. 15A and FIG. 15B are lateral aberration diagrams of the optical system of Embodiment 5, in which FIG. 15A is illustrations of a reference state when focusing on the infinity object and FIG. 15B is illustrations when an image blur on an image plane of 0.5° is corrected (image stabilization is performed).

FIG. 18A and FIG. 18B are lateral aberration diagrams of the optical system of Embodiment 6, in which FIG. 18A is illustrations of a reference state when focusing on the infinity object and FIG. 18B is illustrations when an image blur on an image plane of 0.5° is corrected (image stabilization is performed).

FIG. 21A and FIG. 21B are lateral aberration diagrams of the optical system of Embodiment 7, in which FIG. 21A is illustrations of a reference state when focusing on the infinity object and FIG. 21B is illustrations when an image blur on an image plane of 0.5° is corrected (image stabilization is performed).

FIG. 24A and FIG. 24B are lateral aberration diagrams of the optical system of Embodiment 8, in which FIG. 24A is illustrations of a reference state when focusing on the infinity object and FIG. 24B is illustrations when an image blur on an image plane of 0.5° is corrected (image stabilization is performed).

FIG. 27A and FIG. 27B are lateral aberration diagrams of the optical system of Embodiment 9, in which FIG. 27A is illustrations of a reference state when focusing on the infinity object and FIG. 27B is illustrations when an image blur on an image plane of 0.5° is corrected (image stabilization is performed).

DESCRIPTION OF THE EMBODIMENTS

Preferred embodiments of the present invention will now be described in detail in accordance with the accompanying drawings.

Now, an optical system and an image pickup apparatus including the optical system according to the present invention are described. The optical system of the present invention includes, in order from an object side to an image side, a first lens unit having a positive refractive power, a second lens unit having a positive refractive power, an aperture stop, a third lens unit having a negative refractive power, and a fourth lens unit having a positive refractive power.

The second lens unit is configured to move toward the object side during focusing from infinity to close distance. The second lens unit is a focusing lens unit. The third lens unit is configured to move, during image blur correction, in a direction having a vertical direction component with respect to an optical axis. The third lens unit is an image stabilization lens unit. The lens units as used herein refer to a lens system that is defined by a change in lens interval in an optical axis direction during focusing and a lens system that is defined by movement in the direction having the vertical direction component with respect to the optical axis during image blur correction.

Figure 1:
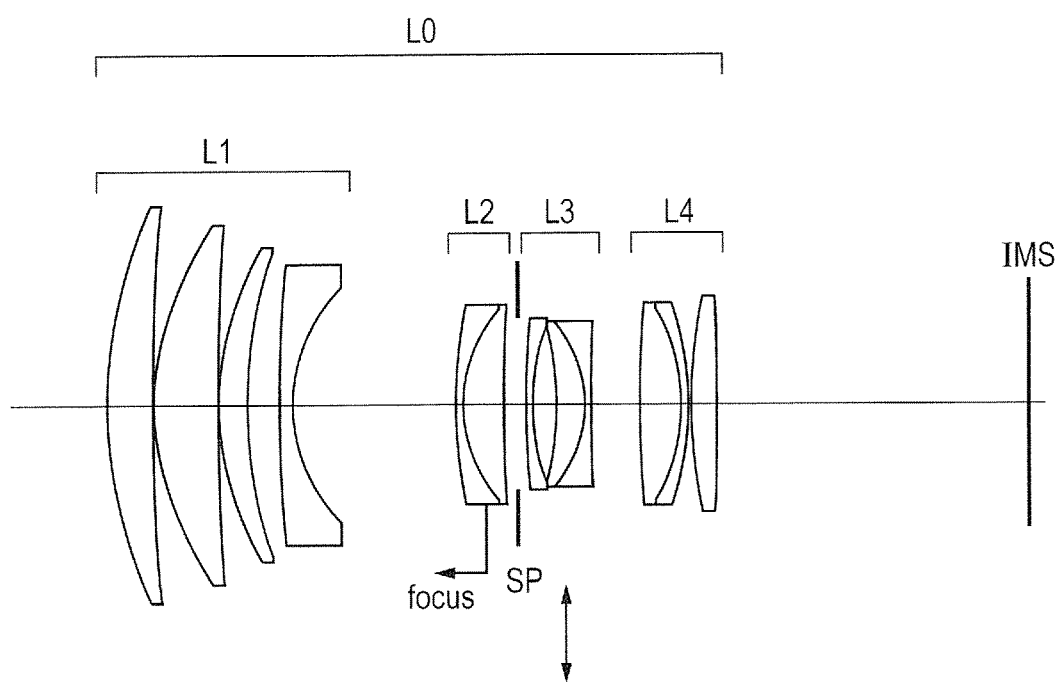
FIG. 1 is a lens sectional view of an optical system according to Embodiment 1 of the present invention when focusing on an infinity object.

FIG. 1 is a lens sectional view of an optical system according to Embodiment 1 of the present invention when focusing on an infinity object. FIG. 2A and FIG. 2B are longitudinal aberration diagrams of the optical system of Embodiment 1 in a case of an infinity object and a case where a lateral magnification is −0.20×, respectively. FIG. 3A and FIG. 3B are lateral aberration diagrams of the optical system of Embodiment 1 in a case of a reference state when focusing on the infinity object and in a case where an image blur on an image plane of 0.5° is corrected (image stabilization is performed), respectively. The optical system of Embodiment 1 is an optical system having an F-number of 2.06 and an image pickup angle of view of 18.44°. The reference state as used herein refers to an image pickup state in which image blur correction is not performed.

Figure 4:
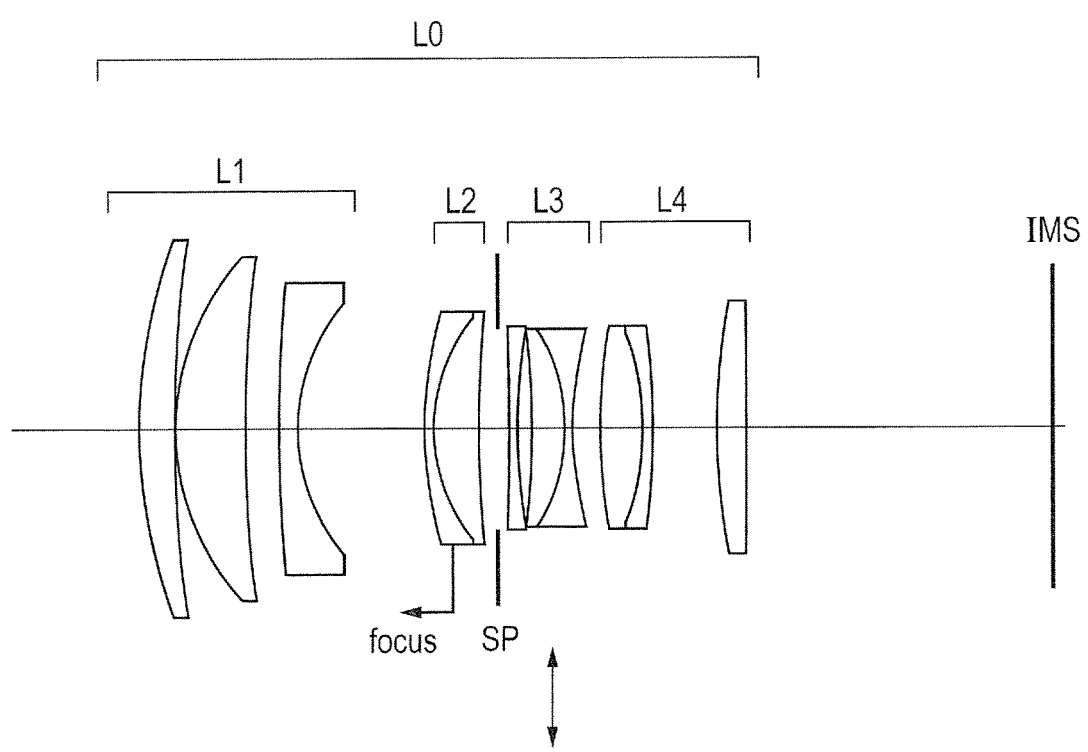
FIG. 4 is a lens sectional view of an optical system according to Embodiment 2 of the present invention when focusing on an infinity object.
Figure 5A:
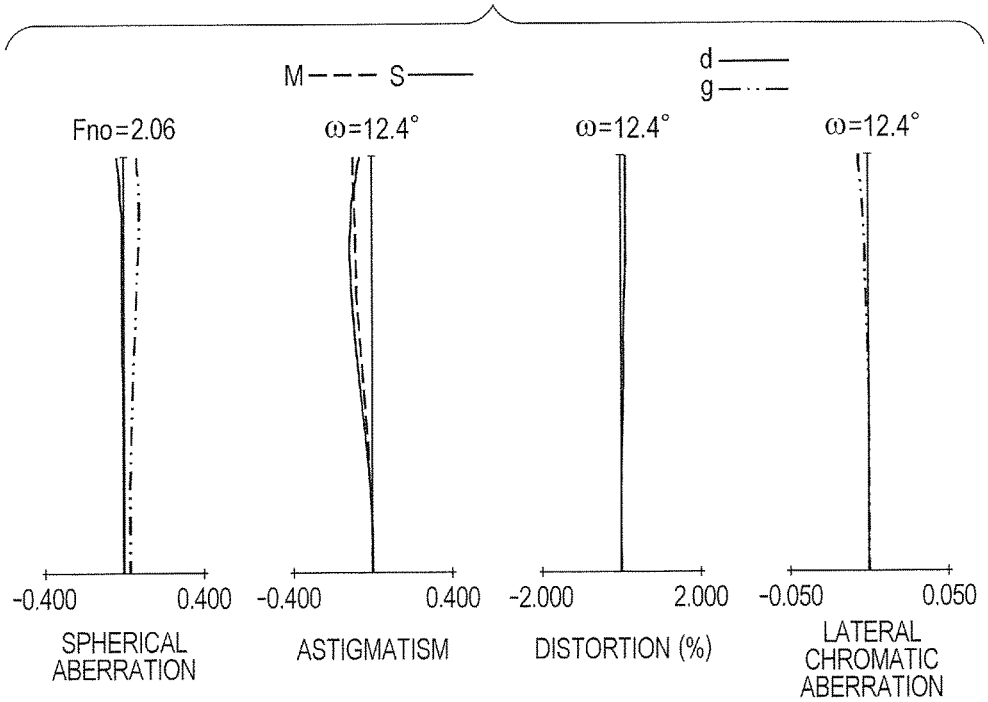
FIG. 5A is a longitudinal aberration diagram of the optical system of Embodiment 2 when focusing on the infinity object.
Figure 5B:
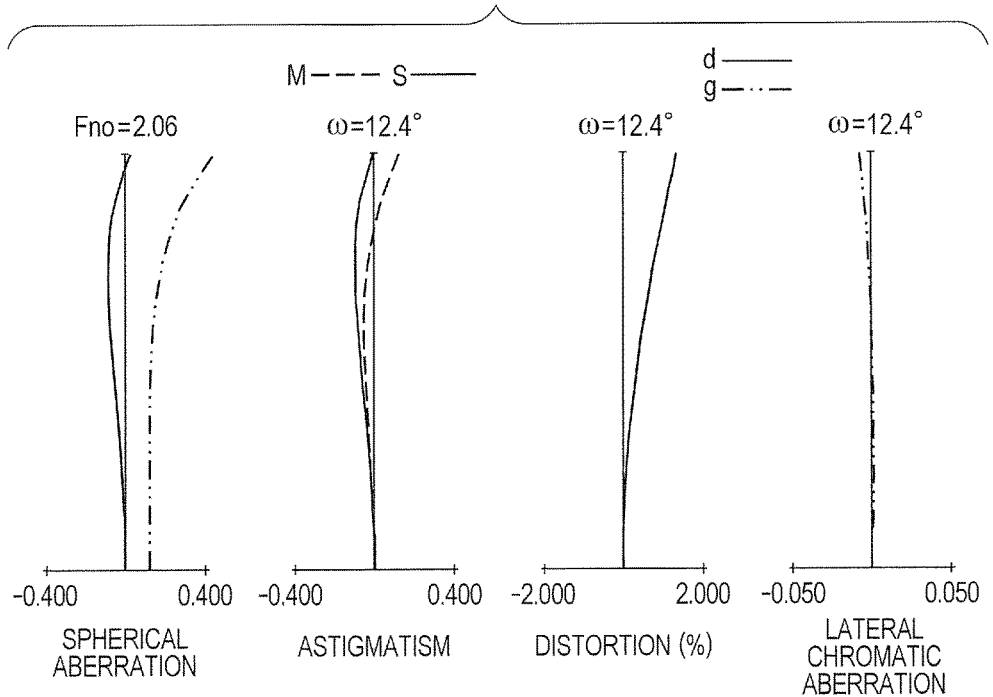
FIG. 5B is a longitudinal aberration diagram of the optical system of Embodiment 2 in a focus state where an imaging magnification is −0.12.

FIG. 4 is a lens sectional view of an optical system according to Embodiment 2 of the present invention when focusing on an infinity object. FIG. 5A and FIG. 5B are longitudinal aberration diagrams of the optical system of Embodiment 2 in a case of an infinity object and a case where a lateral magnification is −0.12×, respectively. FIG. 6A and FIG. 6B are lateral aberration diagrams of the optical system of Embodiment 2 in a case of a reference state when focusing on the infinity object and in a case where an image blur on an image plane of 0.5° is corrected (image stabilization is performed), respectively. The optical system of Embodiment 2 is an optical system having an F-number of 2.06 and an image pickup angle of view of 24.9°.

Figure 7:
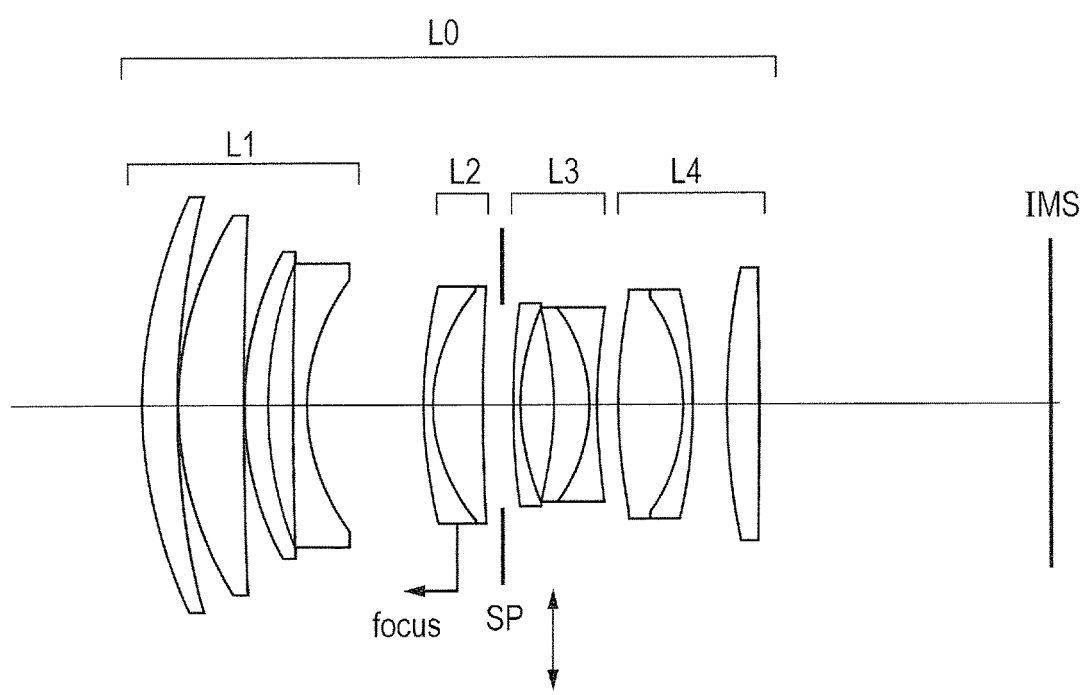
FIG. 7 is a lens sectional view of an optical system according to Embodiment 3 of the present invention when focusing on an infinity object.

FIG. 7 is a lens sectional view of an optical system according to Embodiment 3 of the present invention when focusing on an infinity object. FIG. 8A and FIG. 8B are longitudinal aberration diagrams of the optical system of Embodiment 3 in a case of an infinity object and a case where a lateral magnification is −0.12×, respectively. FIG. 9A and FIG. 9B are lateral aberration diagrams of the optical system of Embodiment 3 in a case of a reference state when focusing on the infinity object and in a case where an image blur on an image plane of 0.5° is corrected (image stabilization is performed), respectively. The optical system of Embodiment 3 is an optical system having an F-number of 1.86 and an image pickup angle of view of 28.88°.

Figure 10:
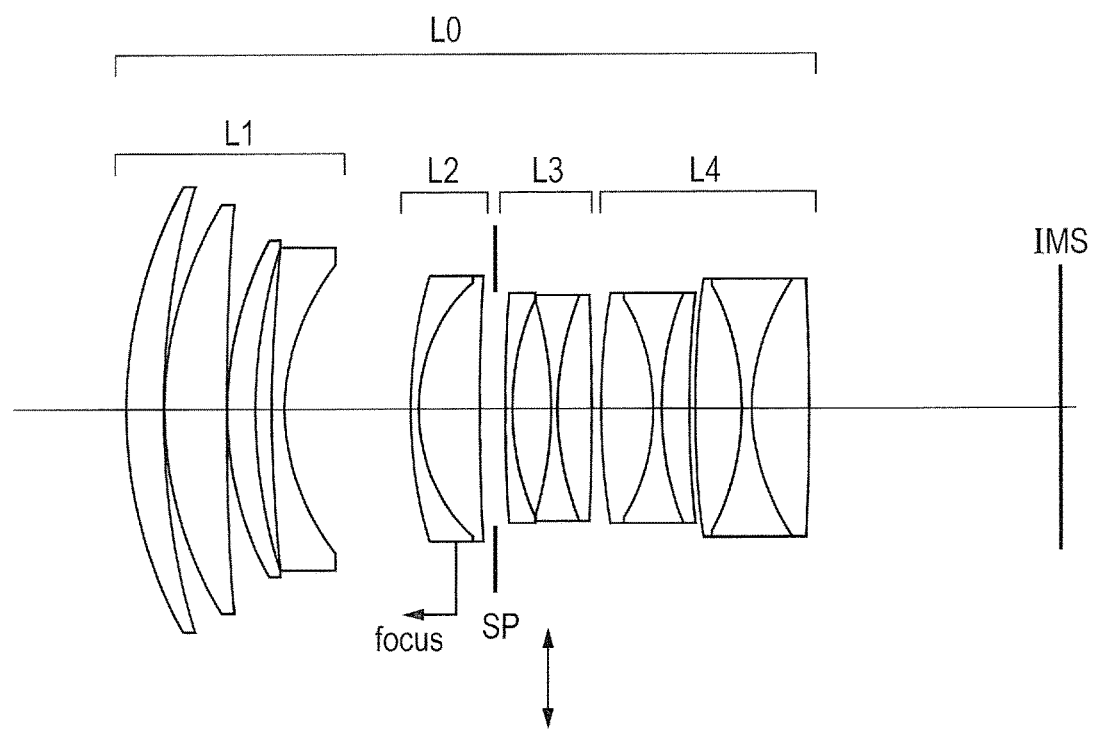
FIG. 10 is a lens sectional view of an optical system according to Embodiment 4 of the present invention when focusing on an infinity object.
Figure 11A:
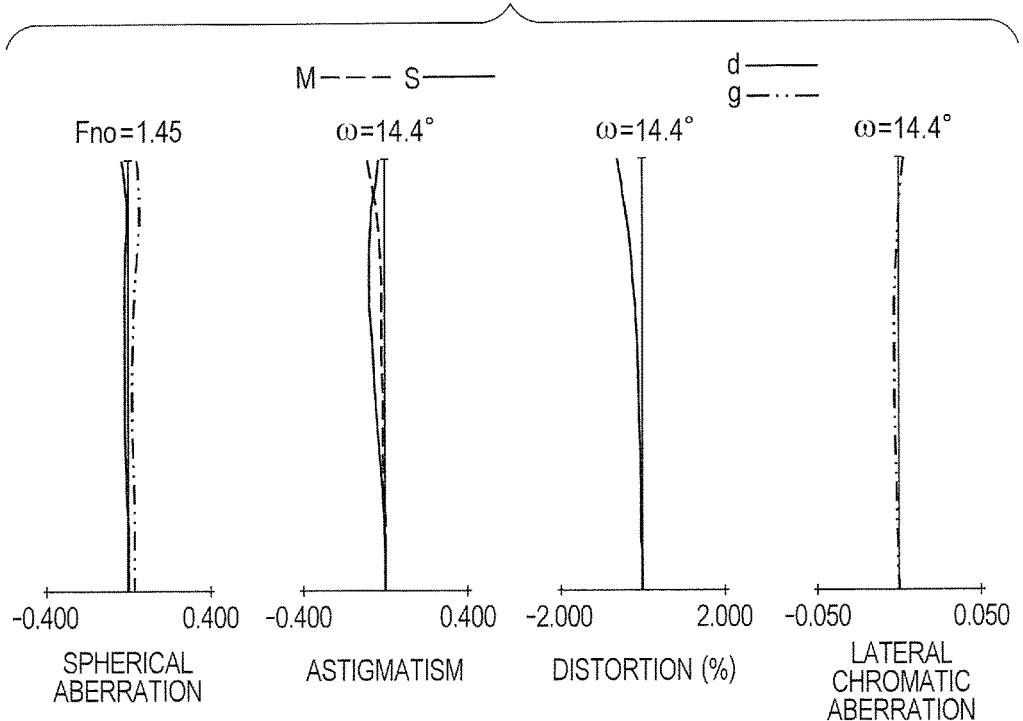
FIG. 11A is a longitudinal aberration diagram of the optical system of Embodiment 4 when focusing on the infinity object.
Figure 11B:
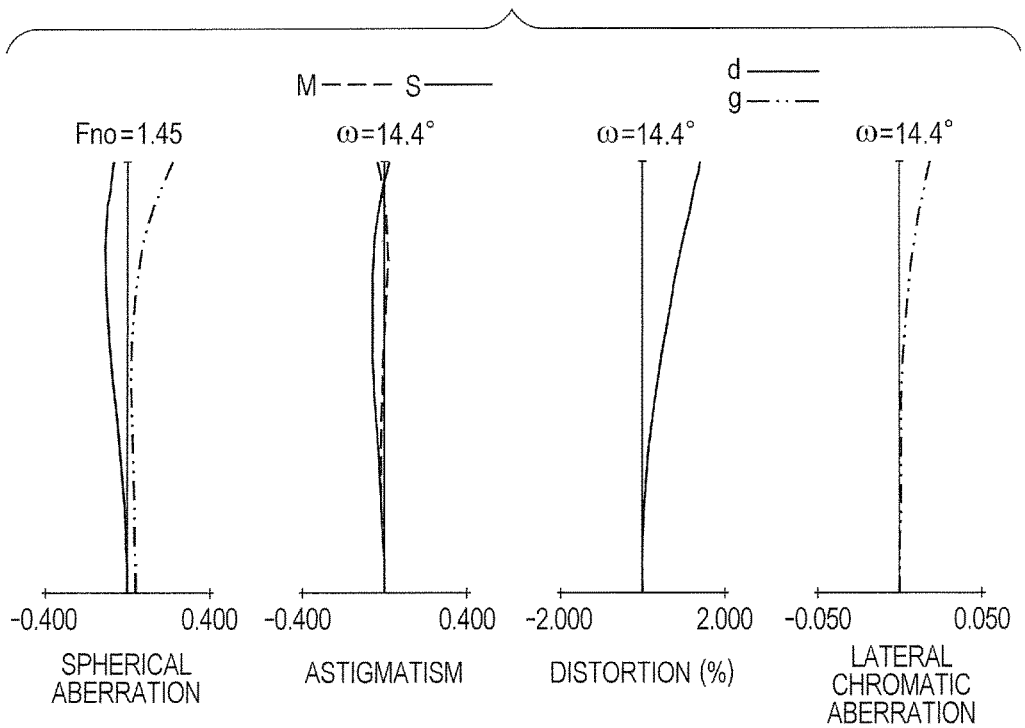
FIG. 11B is a longitudinal aberration diagram of the optical system of Embodiment 4 in a focus state where an imaging magnification is −0.13.

FIG. 10 is a lens sectional view of an optical system according to Embodiment 4 of the present invention when focusing on an infinity object. FIG. 11A and FIG. 11B are longitudinal aberration diagrams of the optical system of Embodiment 4 in a case of an infinity object and a case where a lateral magnification is −0.13×, respectively. FIG. 12A and FIG. 12B are lateral aberration diagrams of the optical system of Embodiment 4 in a case of a reference state when focusing on the infinity object and in a case where an image blur on an image plane of 0.5° is corrected (image stabilization is performed), respectively. The optical system of Embodiment 4 is an optical system having an F-number of 1.45 and an image pickup angle of view of 28.88°.

Figure 13:
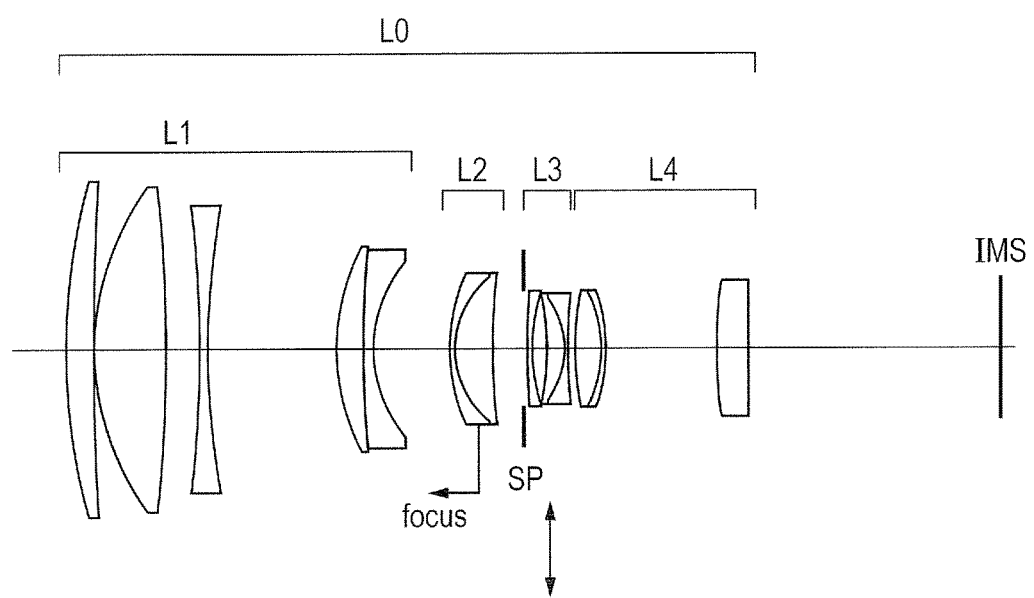
FIG. 13 is a lens sectional view of an optical system according to Embodiment 5 of the present invention when focusing on an infinity object.
Figure 14A:
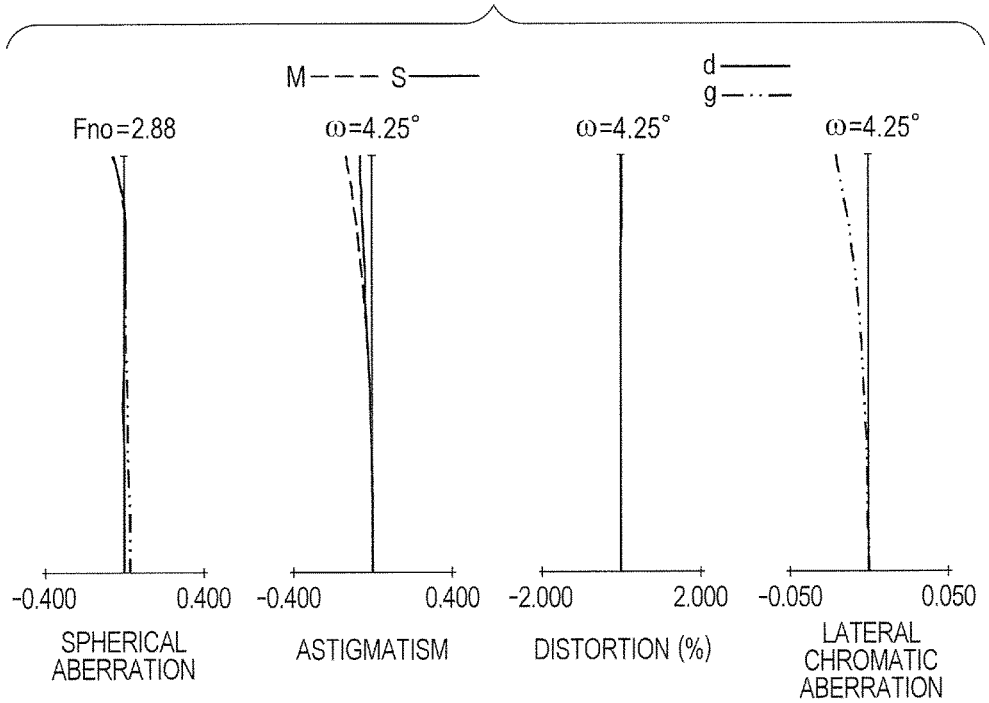
FIG. 14A is a longitudinal aberration diagram of the optical system of Embodiment 5 when focusing on the infinity object.
Figure 14B:
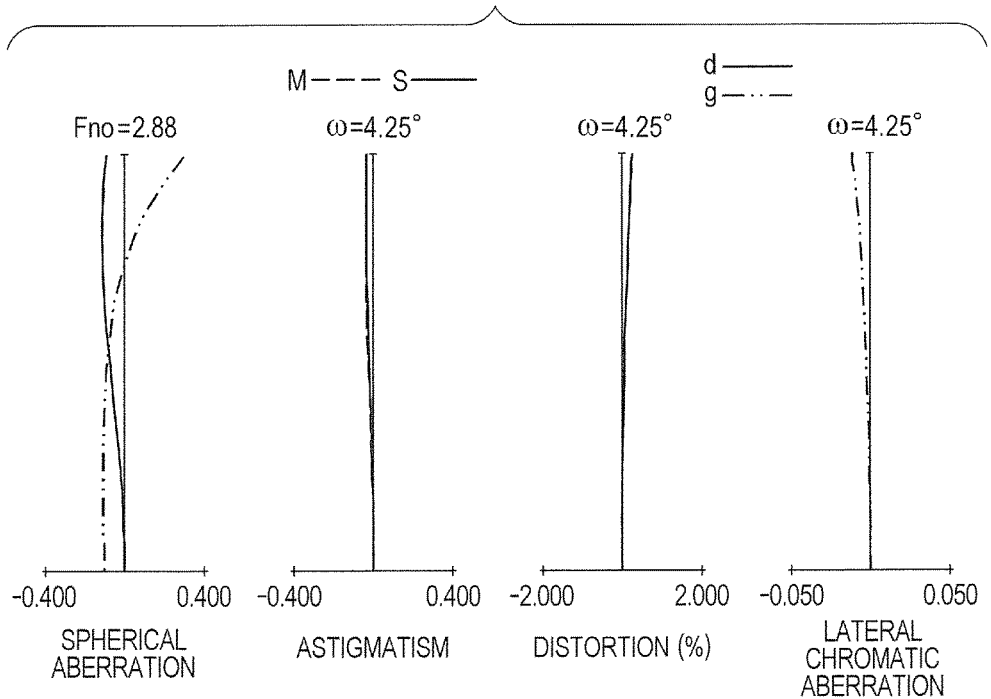
FIG. 14B is a longitudinal aberration diagram of the optical system of Embodiment 5 in a focus state where an imaging magnification is −0.17.

FIG. 13 is a lens sectional view of an optical system according to Embodiment 5 of the present invention when focusing on an infinity object. FIG. 14A and FIG. 14B are longitudinal aberration diagrams of the optical system of Embodiment 5 in a case of an infinity object and a case where a lateral magnification is −0.17×, respectively. FIG. 15A and FIG. 15B are lateral aberration diagrams of the optical system of Embodiment 5 in a case of a reference state when focusing on the infinity object and in a case where an image blur on an image plane of 0.5° is corrected (image stabilization is performed), respectively. The optical system of Embodiment 5 is an optical system having an F-number of 2.88 and an image pickup angle of view of 8.5°.

Figure 16:
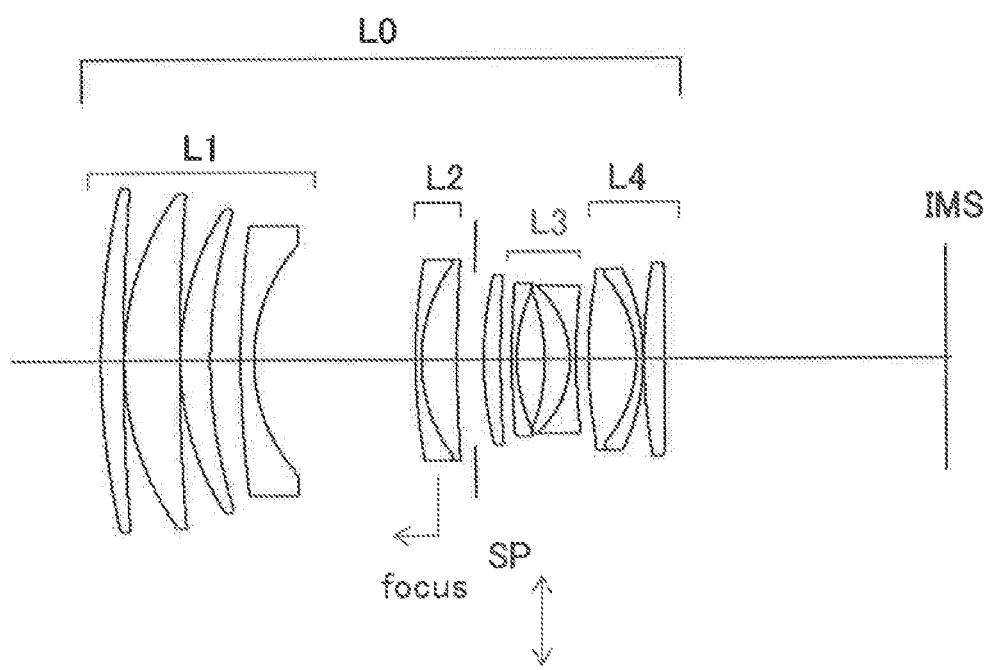
FIG. 16 is a lens sectional view of an optical system according to Embodiment 6 of the present invention when focusing on an infinity object.
Figure 17A:
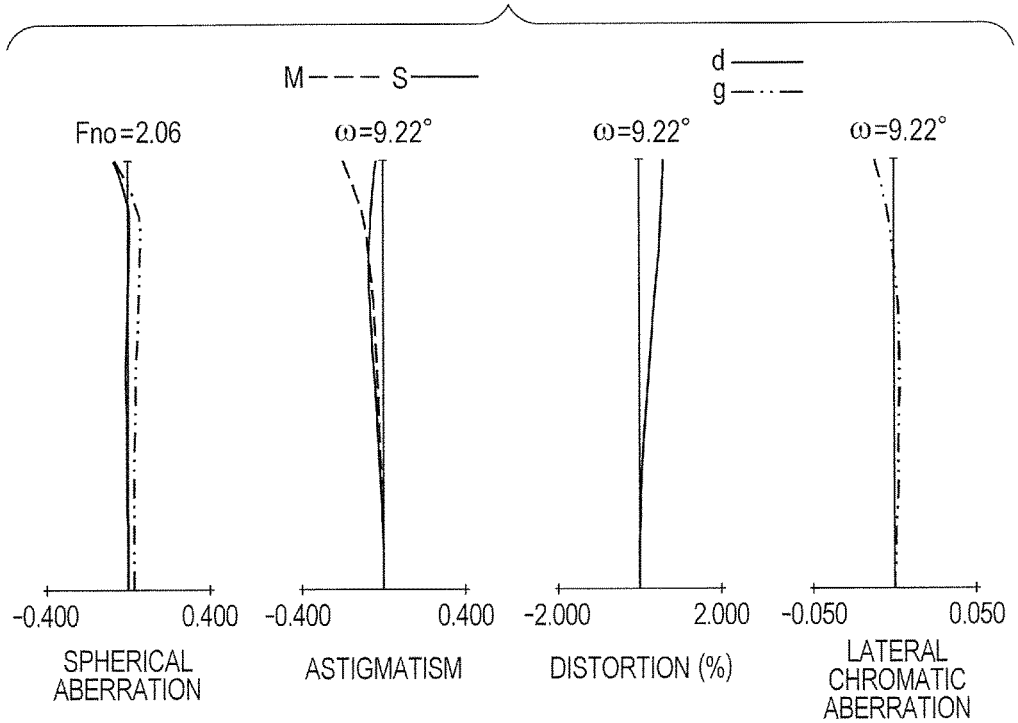
FIG. 17A is a longitudinal aberration diagram of the optical system of Embodiment 6 when focusing on the infinity object.
Figure 17B:
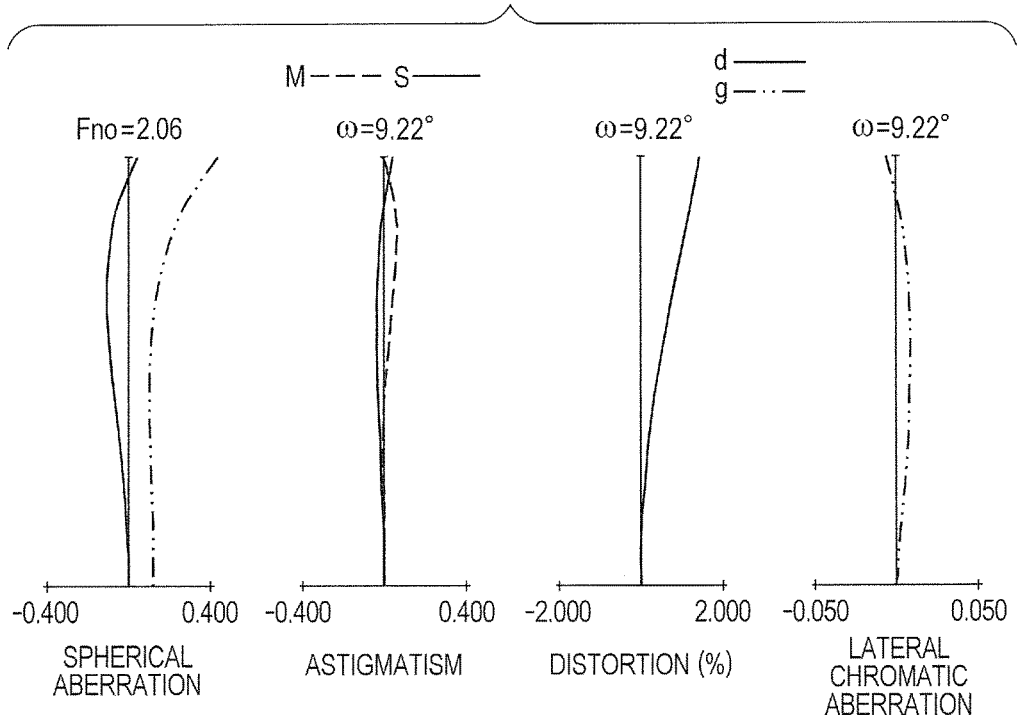
FIG. 17B is a longitudinal aberration diagram of the optical system of Embodiment 6 in a focus state where an imaging magnification is −0.19.

FIG. 16 is a lens sectional view of an optical system according to Embodiment 6 of the present invention when focusing on an infinity object. FIG. 17A and FIG. 17B are longitudinal aberration diagrams of the optical system of Embodiment 6 in a case of an infinity object and a case where a lateral magnification is −0.19×, respectively. FIG. 18A and FIG. 18B are lateral aberration diagrams of the optical system of Embodiment 6 in a case of a reference state when focusing on the infinity object and in a case where an image blur on an image plane of 0.5° is corrected (image stabilization is performed), respectively. The optical system of Embodiment 6 is an optical system having an F-number of 2.06 and an image pickup angle of view of 18.44°.

Figure 19:
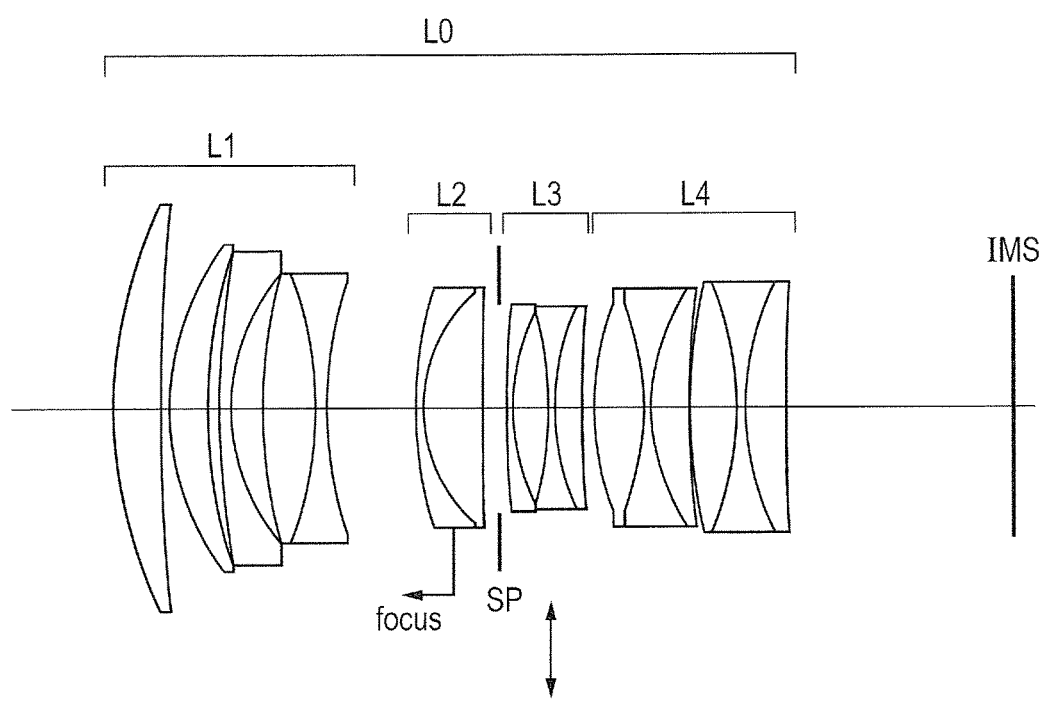
FIG. 19 is a lens sectional view of an optical system according to Embodiment 7 of the present invention when focusing on an infinity object.
Figure 20A:
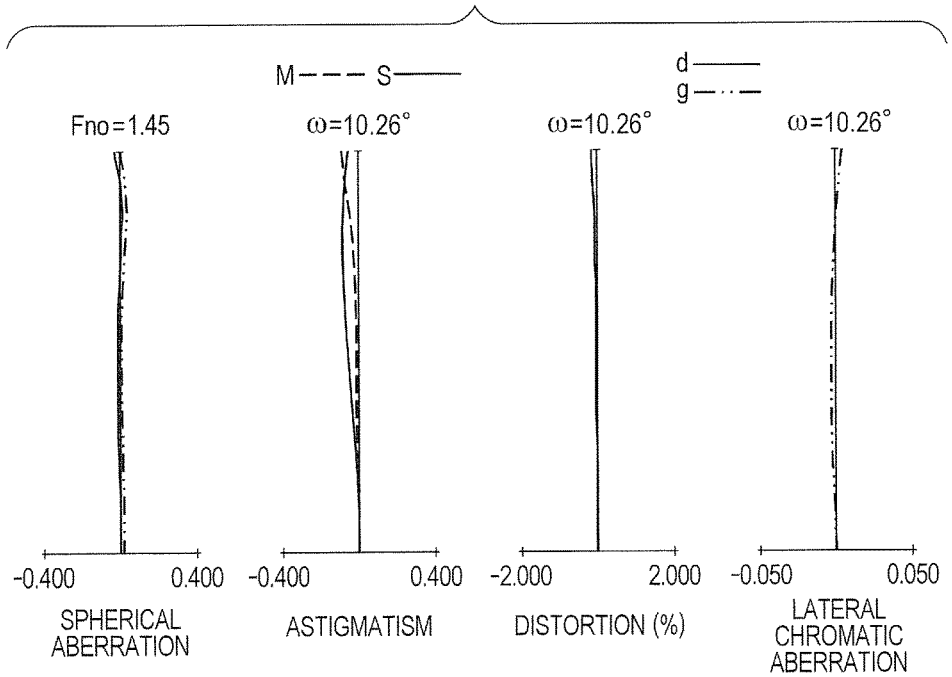
FIG. 20A is a longitudinal aberration diagram of the optical system of Embodiment 7 when focusing on the infinity object.
Figure 20B:
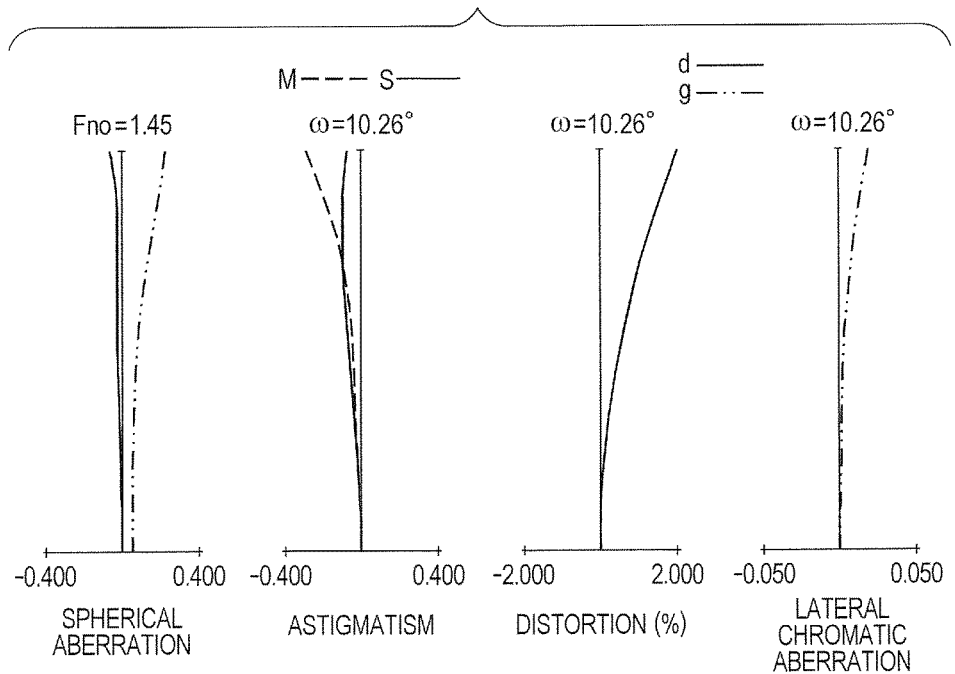
FIG. 20B is a longitudinal aberration diagram of the optical system of Embodiment 7 in a focus state where an imaging magnification is −0.13.

FIG. 19 is a lens sectional view of an optical system according to Embodiment 7 of the present invention when focusing on an infinity object. FIG. 20A and FIG. 20B are longitudinal aberration diagrams of the optical system of Embodiment 7 in a case of an infinity object and a case where a lateral magnification is −0.13×, respectively. FIG. 21A and FIG. 21B are lateral aberration diagrams of the optical system of Embodiment 7 in a case of a reference state when focusing on the infinity object and in a case where an image blur on an image plane of 0.5° is corrected (image stabilization is performed), respectively. The optical system of Embodiment 7 is an optical system having an F-number of 1.45 and an image pickup angle of view of 20.52°.

Figure 22:
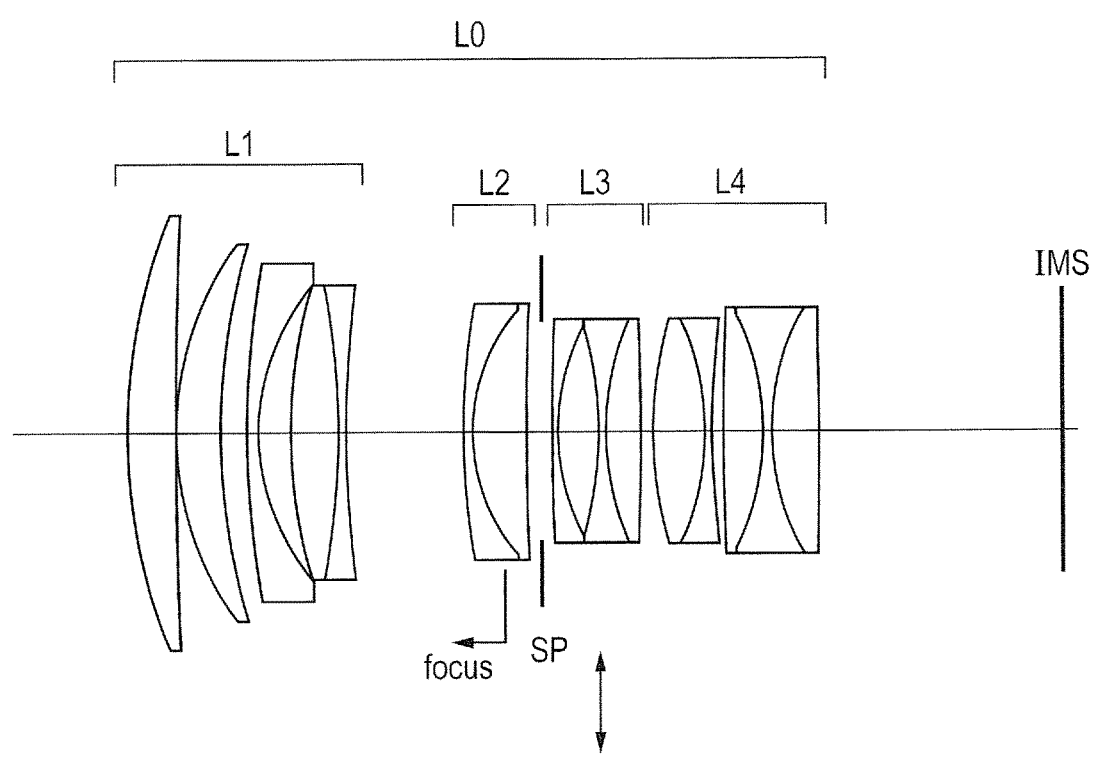
FIG. 22 is a lens sectional view of an optical system according to Embodiment 8 of the present invention when focusing on an infinity object.
Figure 23A:
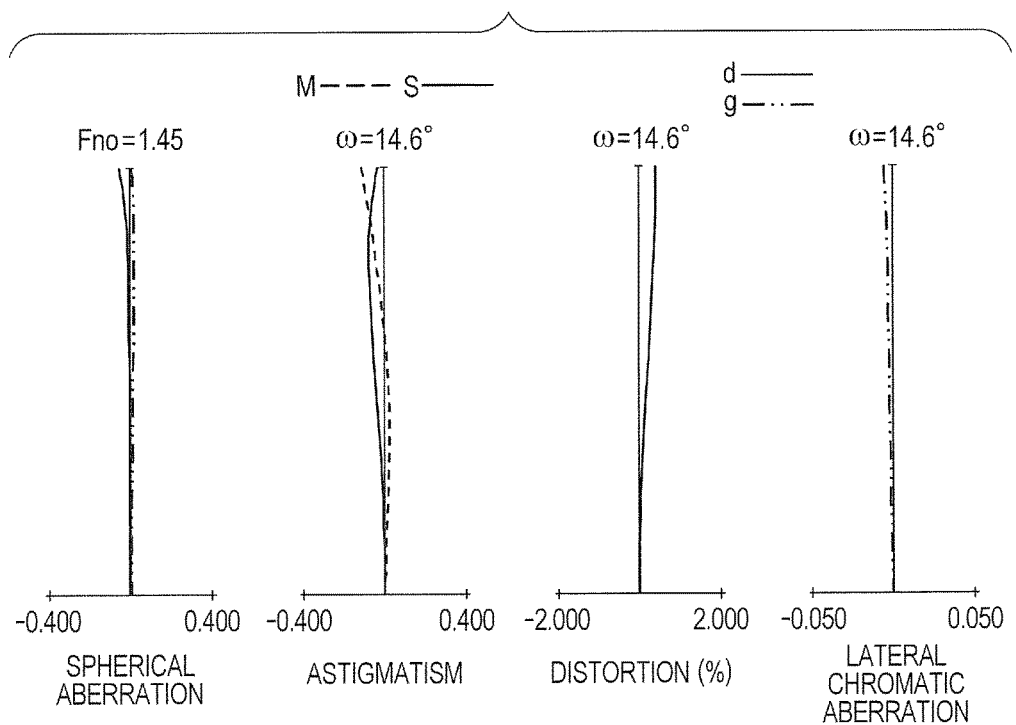
FIG. 23A is a longitudinal aberration diagram of the optical system of Embodiment 8 when focusing on the infinity object.
Figure 23B:
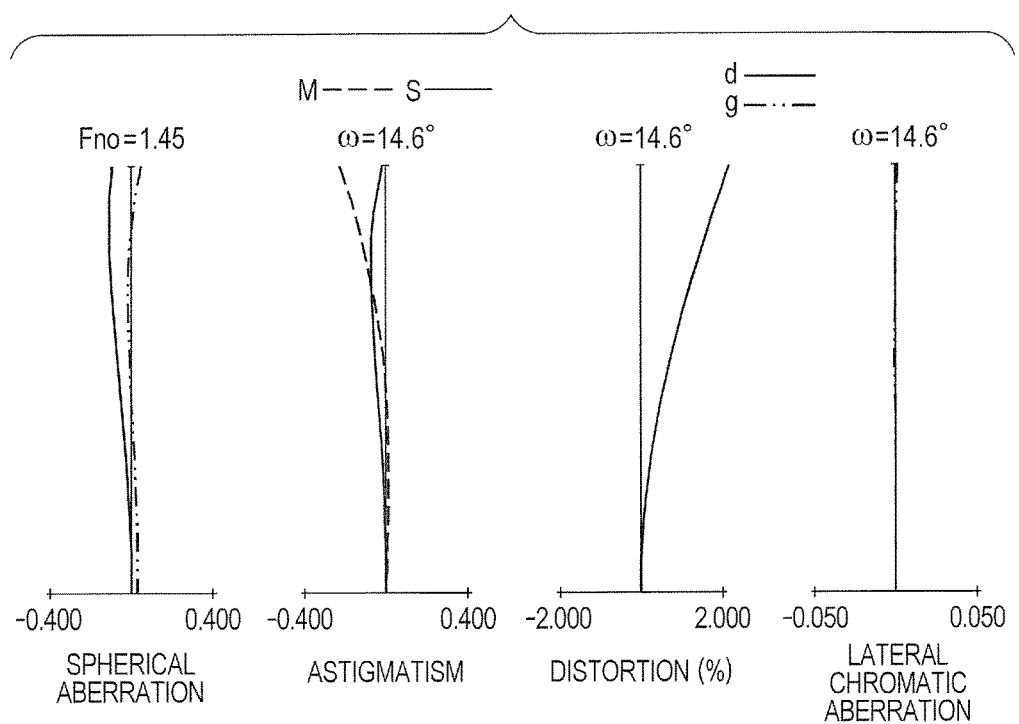
FIG. 23B is a longitudinal aberration diagram of the optical system of Embodiment 8 in a focus state where an imaging magnification is −0.13.
Figures 24A, 24B:
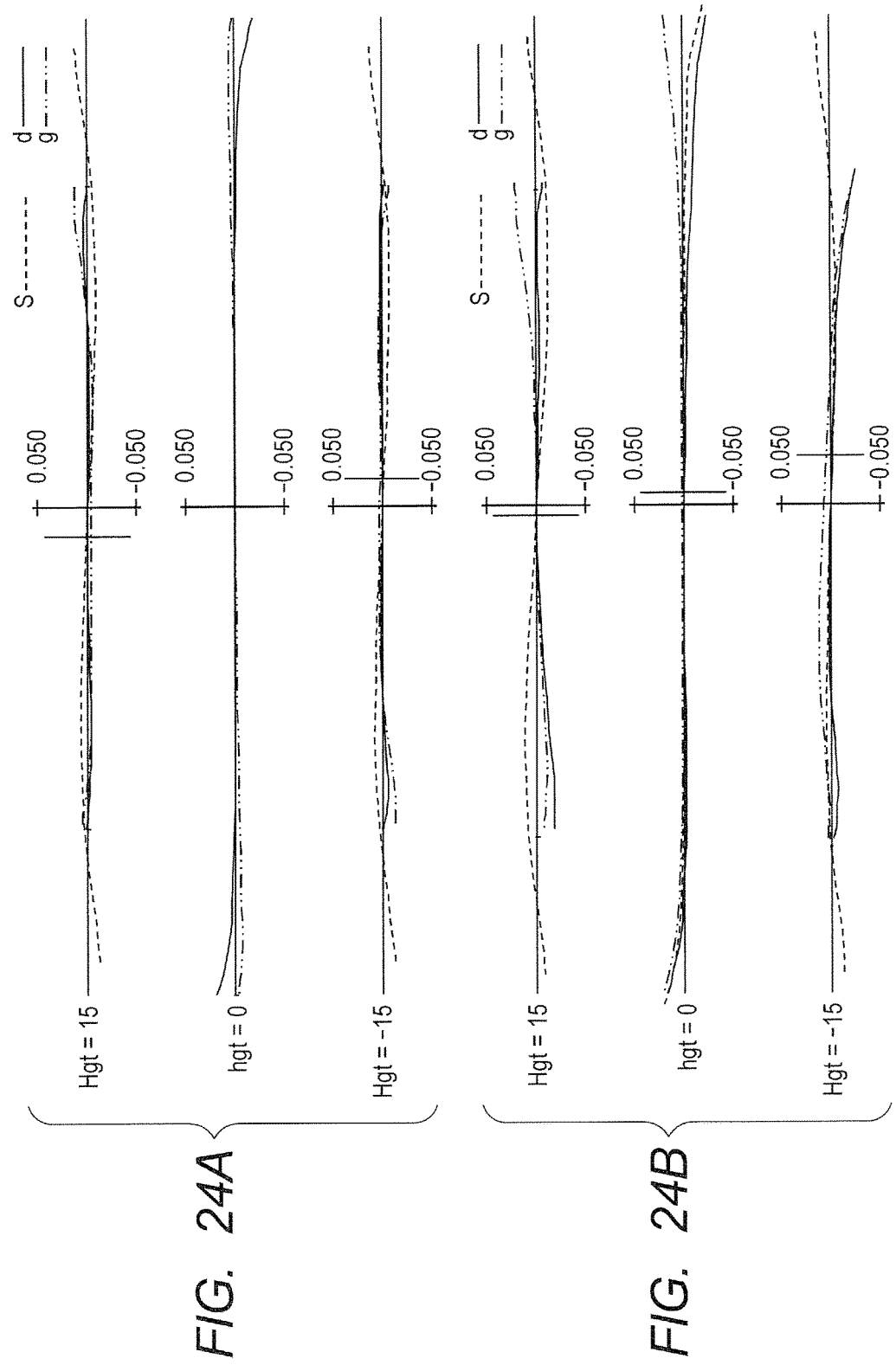

FIG. 22 is a lens sectional view of an optical system according to Embodiment 8 of the present invention when focusing on an infinity object. FIG. 23A and FIG. 23B are longitudinal aberration diagrams of the optical system of Embodiment 8 in a case of an infinity object and a case where a lateral magnification is −0.13×, respectively. FIG. 24A and FIG. 24B are lateral aberration diagrams of the optical system of Embodiment 8 in a case of a reference state when focusing on the infinity object and in a case where an image blur on an image plane of 0.5° is corrected (image stabilization is performed), respectively. The optical system of Embodiment 8 is an optical system having an F-number of 1.45 and an image pickup angle of view of 29.26°.

Figure 25:
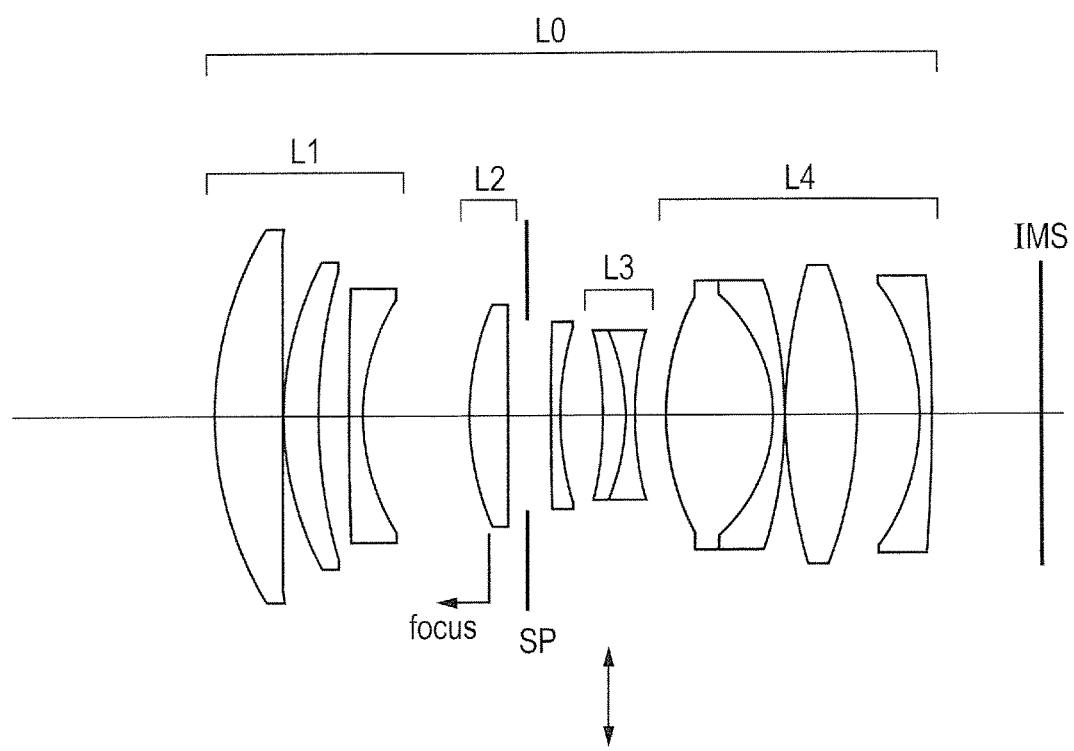
FIG. 25 is a lens sectional view of an optical system according to Embodiment 9 of the present invention when focusing on an infinity object.
Figure 26A:
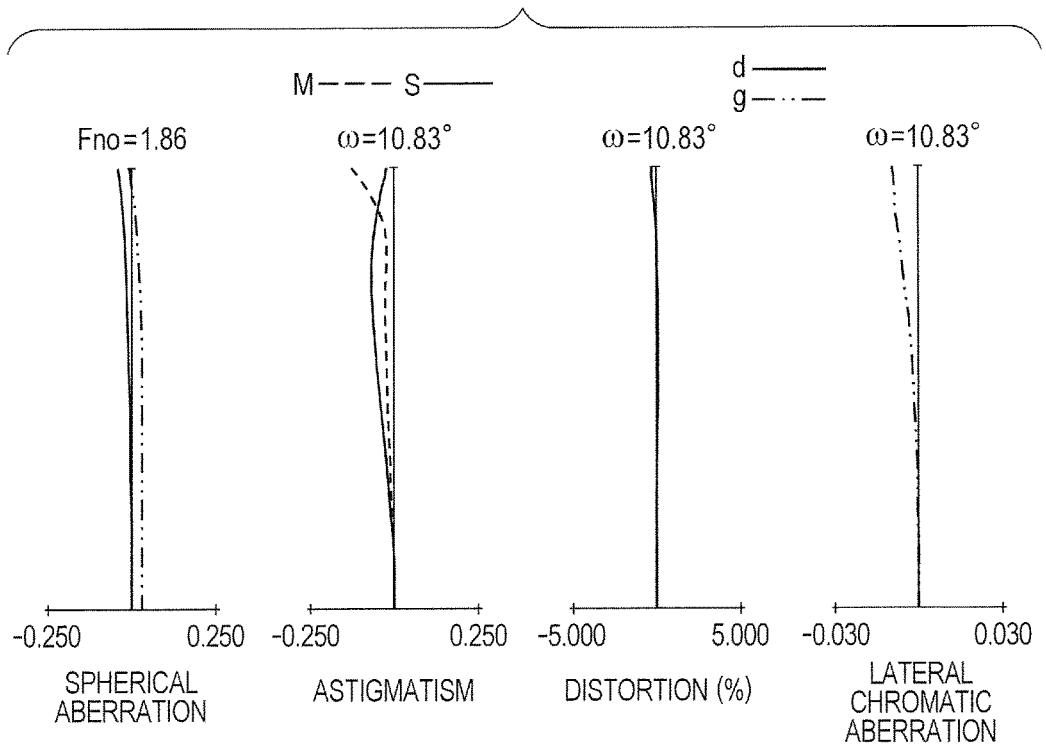
FIG. 26A is a longitudinal aberration diagram of the optical system of Embodiment 9 when focusing on the infinity object.
Figure 26B:
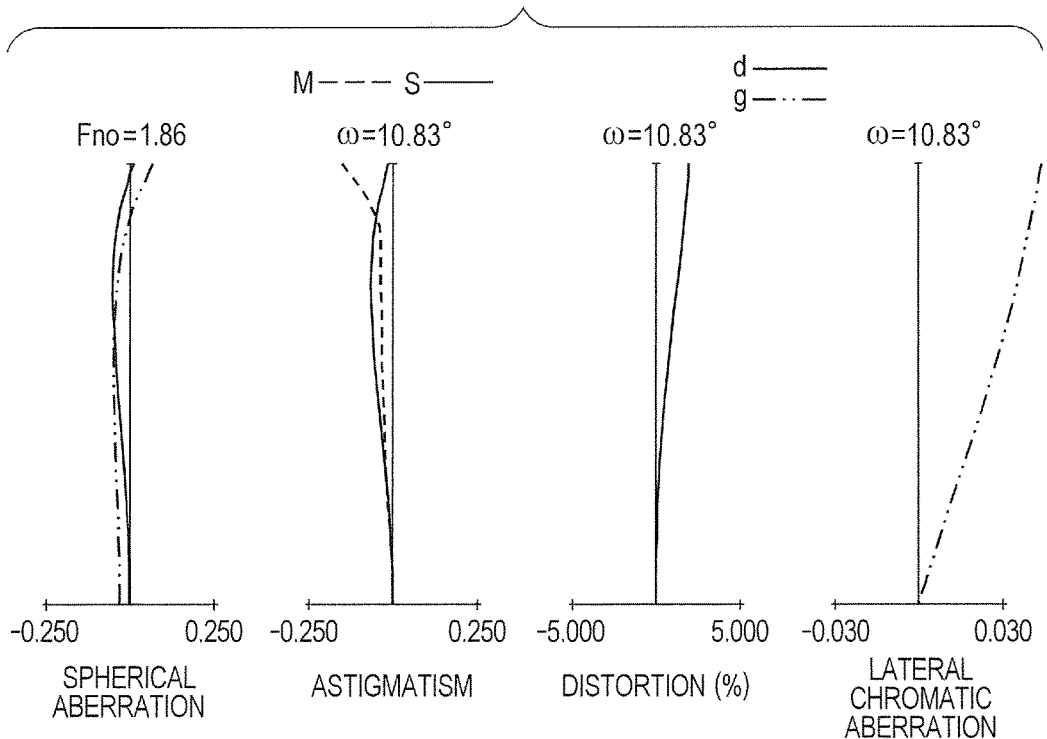
FIG. 26B is a longitudinal aberration diagram of the optical system of Embodiment 9 in a focus state where an imaging magnification is −0.17.
Figure 29:
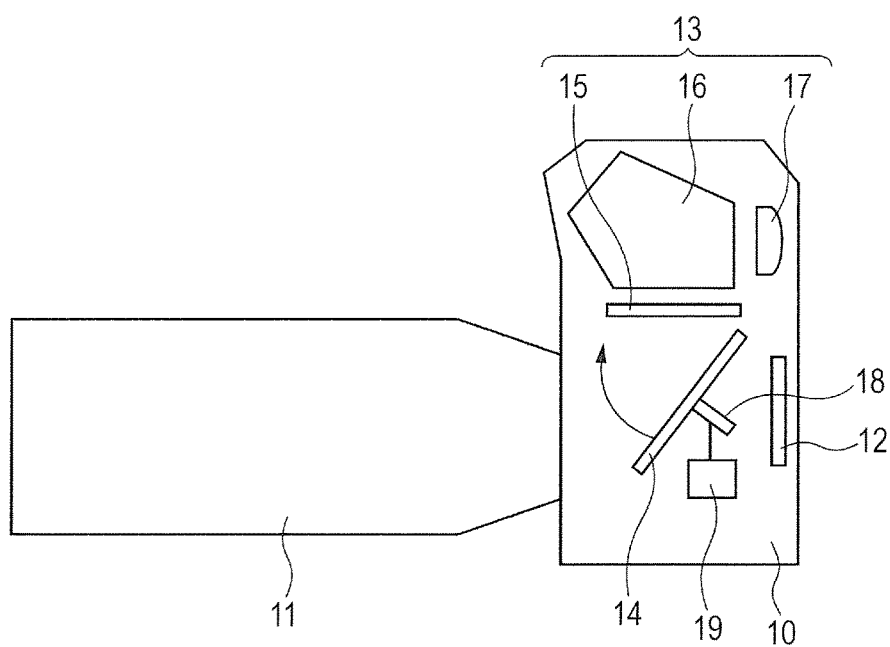
FIG. 29 is a schematic view of a main part of an image pickup apparatus of the present invention.

FIG. 25 is a lens sectional view of an optical system according to Embodiment 9 of the present invention when focusing on an infinity object. FIG. 26A and FIG. 26B are longitudinal aberration diagrams of the optical system of Embodiment 9 in a case of an infinity object and a case where a lateral magnification is −0.17×, respectively. FIG. 27A and FIG. 27B are lateral aberration diagrams of the optical system of Embodiment 9 in a case of a reference state when focusing on the infinity object and in a case where an image blur on an image plane of 0.5° is corrected (image stabilization is performed), respectively. The optical system of Embodiment 9 is an optical system having an F-number of 1.86 and an image pickup angle of view of 21.66°. FIG. 29 is a schematic view of a main part of an image pickup apparatus of the present invention. The optical system of each Embodiment is formed of a telephoto image pickup optical system having a long focal length.

The telephoto image pickup optical system as used herein refers to an optical system having an image pickup angle of view of from about 8.5° to about 29.5°. In the lens sectional views, the left side corresponds to the object side (front side, magnification side), and the right side corresponds to the image side (rear side, reduction side). An optical system L0 includes, in order from the object side to the image side, a first lens unit L1 having a positive refractive power, a second lens unit L2 having a positive refractive power, an aperture stop SP, a third lens unit L3 having a negative refractive power, and a fourth lens unit L4 having a positive refractive power.

An image plane IMS corresponds to an image pickup plane of a solid-state image pickup element (photoelectric conversion element) such as a CCD sensor or a CMOS sensor when used as an image pickup optical system of a video camera or a digital still camera, and corresponds to a film plane when used for a silver-halide film camera. In a spherical aberration diagram, the solid line indicates the d-line (wavelength: 587.6 nm) and the two-dot chain line indicates the g-line (wavelength: 435.8 nm), respectively. In the astigmatism diagram, the solid line indicates a meridional image plane on the d-line, and the broken line indicates a sagittal image plane on the d-line. Further, distortion is indicated by the d-line. An F-number is represented by Fno, and a half angle of view (degree) is represented by ω.

In each lateral aberration diagram, the solid line indicates a meridional light beam on the d-line, the dotted line indicates a sagittal light beam on the d-line, and the two-dot chain line indicates a meridional light beam on the g-line. An image height is represented by hgt.

Figure 28:
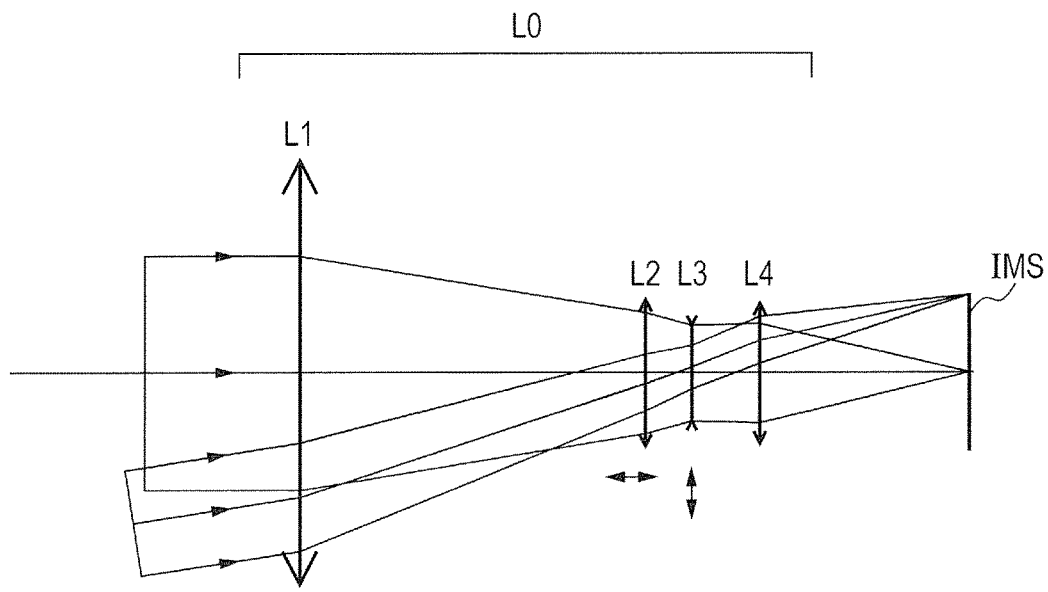
FIG. 28 is an explanatory diagram of the paraxial refractive power arrangement of the optical system of the present invention.

FIG. 28 is a schematic diagram of the paraxial refractive power arrangement and an optical path of the optical system L0 of the present invention. In the telephoto image pickup lens having a large aperture, an on-axial ray enters the front lens (first lens unit L1) at a high incident height, and hence the lenses arranged on the front side of the aperture stop SP have larger lens effective diameters at positions farther from the aperture stop SP.

On the other hand, an off-axial ray enters the lenses positioned on the image side of the aperture stop SP at a high incident height, and hence the lenses arranged on the rear side of the aperture stop SP have larger lens effective diameters at positions farther from the aperture stop SP. Thus, in order to reduce both the lens units of the focusing lens unit and the image stabilization lens unit in size, it is preferred to arrange those lens units near the aperture stop SP.

The telephoto optical system L0 having a large aperture according to the present invention includes, in order from the object side to the image side, the first lens unit L1 having a positive refractive power, the second lens unit L2 having a positive refractive power, the third lens unit L3 having a negative refractive power, and the fourth lens unit L4 having a positive refractive power. The second lens unit L2 is driven in the optical axis direction to perform focusing. The third lens unit L3 is driven to have the vertical direction component with respect to the optical axis to correct an image blur. The focusing lens unit and the image stabilization lens unit are arranged near the middle of the optical system L0 such that those lens units have small effective diameters.

Further, the above-mentioned effect is obtained through arrangement of the aperture stop SP near the second lens unit L2 and the third lens unit L3. In each Embodiment, the aperture stop SP is arranged between the second lens unit L2 and the third lens unit L3. The second lens unit L2 is driven to the object side during focusing from infinity to close distance. The thin first lens unit L1 is used in order to secure, on the object side of the second lens unit L2, a space for movement of the second lens unit L2. If the first lens unit L1 is not sufficiently thin, the entire lens system is increased in size. Thus, it is important to appropriately determine the configuration of the first lens unit L1.

In the optical system L0 of the present invention, the first lens unit L1 is composed of five or less lens elements. The lens element as used herein means a single lens or a cemented lens obtained by cementing a plurality of lenses.

The first lens unit L1 has a configuration similar to that of a front lens system of a so-called Gauss lens system. Specifically, the first lens unit L1 includes, in order from the object side to the image side, two positive lenses or three positive lenses having convex surfaces facing the object side, and a negative lens having a concave surface facing the image plane side. As a consequence, reduction in total lens length and aberration correction are satisfactorily achieved. Spherical aberrations are easily corrected when three positive lenses are used. In addition, a cemented lens or a positive lens and a negative lens may be arranged on the image plane side of the negative lens, and chromatic aberrations are more easily corrected in this case.

In the optical system of the present invention, a distance on the optical axis from the lens surface closest to the object side of the third lens unit L3 to the image plane is represented by D3, and the focal length of the entire system is represented by f. Here, when an optical material formed of a parallel plate, e.g., a faceplate or an optical filter is arranged between the final lens surface and the image plane, the distance D3 is determined with the use of an air-equivalent value of the thickness of the optical material. This holds true in the following description. In this case, the following conditional expression is satisfied.

$$0.30 < D3/f < 1.30 \quad (1)$$

Next, the technical meaning of the above-mentioned conditional expression is described. The conditional expression (1) relates to a position of the third lens unit L3 for image blur correction in the optical axis direction, at which the effective diameter of the third lens unit L3 is small. When the value falls below the lower limit of the conditional expression (1) and the third lens unit L3 is positioned near the image plane, an off-axial ray enters the third lens unit L3 at a high incident height, and hence the third lens unit L3 has a large lens effective diameter. Further, when the value exceeds the upper limit of the conditional expression (1) and the third lens unit L3 is positioned on the object side, an on-axial ray enters the third lens unit L3 at a high incident height, and hence the third lens unit L3 has a large lens effective diameter.

It is more preferred to set the numerical range of the conditional expression (1) as follows:

$$0.45 < D3/f < 1.10 \quad (1a)$$

It is more preferred to set the numerical range of the conditional expression (1a) as follows:

$$0.49 < D3/f < 1.02 \quad (1b)$$

The present invention employs the configuration described above such that the focusing lens unit and the image stabilization lens unit have small effective diameters, to thereby reduce the optical system in size.

In the optical system of the present invention, it is more preferred to satisfy one or more of the following conditional expressions. A distance on the optical axis from the lens surface closest to the image side of the second lens unit L2 to the lens surface closest to the object side of the third lens unit L3 when focusing on infinity is represented by D23. A distance on the optical axis from the lens surface closest to the image side of the first lens unit L1 to the lens surface closest to the object side of the second lens unit L2 when focusing on infinity is represented by D12. The focal length of the first lens unit L1 is represented by f1. The focal length of the second lens unit L2 is represented by f2. The focal length of the third lens unit L3 is represented by f3. The focal length of the fourth lens unit L4 is represented by f4.

The lateral magnification of the second lens unit L2 when focusing on infinity is represented by β2. The lateral magnification of the third lens unit L3 when focusing on infinity is represented by β3. A distance on the optical axis from the vertex position of the lens surface of the lens closest to the object side to the image plane is represented by L. In this case, it is preferred to satisfy one or more of the following conditional expressions.

$$0.01 < D23/f < 0.20 \quad (2)$$

$$0.043 < D12/f < 0.300 \quad (3)$$

$$1.00 < f1/f < 7.00 \tag{4}$$

$$0.27 < f2/f < 2.00 \tag{5}$$

$$-1.0 < f3/f < -0.1 \tag{6}$$

$$-2.0 < f3/f4 < -0.4 \tag{7}$$

$$0.05 < \beta 2 < 0.70 \tag{8}$$

$$1/\beta 3^2 < 0.20 \tag{9}$$

$$0.4 < D3/L < 0.7 \tag{10}$$

Next, the technical meaning of each conditional expression described above is described. The conditional expression (2) defines an interval between the second lens unit L2 and the third lens unit L3. When the value exceeds the upper limit of the conditional expression (2) and the second lens unit L2 and the third lens unit L3 are too far from each other, one of the second lens unit L2 and the third lens unit L3 has a large lens effective diameter. When the value falls below the lower limit of the conditional expression (2) and the second lens unit L2 and the third lens unit L3 are close to each other, it is difficult to arrange mechanical mechanisms, which is not preferred.

The conditional expression (3) defines an interval between the first lens unit L1 and the second lens unit L2. When the value exceeds the upper limit of the conditional expression (3) and the first lens unit L1 and the second lens unit L2 are too far from each other, the first lens unit L1 has a large lens effective diameter, leading to increase in entire system in size. When the value falls below the lower limit of the conditional expression (3), it is difficult to secure a space for movement of the second lens unit L2 for focusing.

The conditional expression (4) defines the focal length of the first lens unit L1. When the value exceeds the upper limit of the conditional expression (4) and the first lens unit L1 has a too long focal length, the first lens unit L1 is increased in size. When the value falls below the lower limit of the conditional expression (4) and the first lens unit L1 has a short focal length, while the entire system is advantageously reduced in size, it is difficult to correct various aberrations, especially spherical aberrations, axial chromatic aberrations, and lateral chromatic aberrations.

The conditional expression (5) defines the focal length of the second lens unit L2. The second lens unit L2 is the focusing lens unit, and it is important to appropriately set the focal length in order to satisfactorily correct various aberrations while a movement amount of the second lens unit L2 during focusing is reduced. When the value exceeds the upper limit of the conditional expression (5) and the second lens unit L2 has a long focal length, the movement amount during focusing is increased, leading to increase in entire system in size.

When the value falls below the lower limit of the conditional expression (5) and the second lens unit L2 has a short focal length, aberration deviation, especially deviation of spherical aberrations during focusing is increased, and it is difficult to correct the deviation of the aberrations. The conditional expression (6) defines the focal length of the third lens unit L3. The third lens unit L3 is the image stabilization lens unit. The conditional expression (6) is intended to reduce image degradation that occurs when the third lens unit L3 is driven to have the vertical direction component with respect to the optical axis in order to correct an image blur.

When the value falls below the lower limit of the conditional expression (6) and the third lens unit L3 has a large absolute value of a negative focal length, a movement amount of the third lens unit L3 for image blur correction is increased, which is not preferred. When the value exceeds the upper limit of the conditional expression (6) and the third lens unit L3 has a small absolute value of the negative focal length, aberrations, especially decentering coma and a partial blur on the sagittal image plane during image blur correction are increased, and it is difficult to correct those aberrations. It is preferred that the third lens unit L3 include a negative lens component having a concave surface facing the image side and a negative lens component having a concave surface facing the object side. Alternatively, it is preferred that the third lens unit L3 include a negative lens component having a concave surface facing the image side and a biconcave negative lens component. With this configuration, decentering coma is easily corrected satisfactorily.

The conditional expression (7) defines a ratio of the focal length of the third lens unit L3 to the focal length of the fourth lens unit L4. When the value exceeds the upper limit of the conditional expression (7) and the third lens unit L3 has a small absolute value of the negative focal length or the fourth lens unit L4 has a long focal length, the total lens length is increased. When the value falls below the lower limit of the conditional expression (7) and the third lens unit L3 has a large absolute value of the negative focal length or the fourth lens unit L4 has a short focal length, a Petzval sum is increased in the positive direction, and a field curvature is increased in the negative direction.

The conditional expression (8) defines the lateral magnification of the second lens unit L2. When the value exceeds the upper limit of the conditional expression (8) and the second lens unit L2 has a large lateral magnification, the movement amount of the second lens unit L2 during focusing is increased, leading to increase in entire system in size. When the value falls below the lower limit of the conditional expression (8) and the second lens unit L2 has a small lateral magnification, the focal length of the first lens unit L1 is increased, leading to increase in entire system in size.

The conditional expression (9) defines the lateral magnification of the third lens unit L3. When an on-axial ray exiting from the third lens unit L3 is substantially afocal, the lateral magnification β3 has a large value and the value of the conditional expression (9) is small. With the arrangement in which an on-axial ray exiting from the third lens unit L3 is substantially afocal, image degradation, especially decentering coma and a partial blur on the meridional image plane during image blur correction are satisfactorily corrected. When the value exceeds the upper limit of the conditional expression (9) and the optical arrangement is not afocal, decentering coma and a partial blur on the meridional image plane during image blur correction are increased, and it is difficult to correct those aberrations.

The conditional expression (10) defines a relationship between the total lens length and a position of the third lens unit L3 in the optical axis direction. When the value exceeds the upper limit of the conditional expression (10) and the third lens unit L3 is arranged on the object side, an on-axial ray enters the second lens unit L2, which is arranged on the object side of the third lens unit L3, at a high incident height, and hence the second lens unit L2 has a large lens effective diameter. When the value falls below the lower limit of the conditional expression (10) and the third lens unit L3 is arranged on the image plane side, it is difficult to obtain a long back focus. It is more preferred to set the numerical range of the conditional expressions (2) to (10) as follows.

$$0.017 < D23/f < 0.190 \quad (2a)$$

$$0.06 < D12/f < 0.25 \quad (3a)$$

$$1.05 < f1/f < 6.00 \quad (4a)$$

$$0.35 < f2/f < 1.50 \quad (5a)$$

$$-0.80 < f3/f < -0.11 \quad (6a)$$

$$-1.6 < f3/f4 < -0.5 \quad (7a)$$

$$0.10 < \beta 2 < 0.56 \quad (8a)$$

$$1/\beta 3^2 < 0.12 \quad (9a)$$

$$0.48 < D3/L < 0.65 \quad (10a)$$

It is more preferred to set the numerical range of the conditional expressions (2a) to (10a) as follows:

$$0.025 < D23/f < 0.180 \quad (2b)$$

$$0.070 < D12/f < 0.232 \quad (3b)$$

$$1.10 < f1/f < 5.22 \quad (4b)$$

$$0.45 < f2/f < 1.48 \quad (5b)$$

$$-0.78 < f3/f < -0.12 \quad (6b)$$

$$-1.55 < f3/f4 < -0.52 \quad (7b)$$

$$0.16 < \beta 2 < 0.52 \quad (8b)$$

$$1/\beta 3^2 < 0.09 \quad (9b)$$

$$0.5 < D3/L < 0.6 \quad (10b)$$

In each Embodiment, the first lens unit L1 to the third lens unit L3 have the following lens configurations. The first lens unit L1 consists of, in order from the object side to the image side, a positive lens, a positive lens, a positive lens, and a negative lens. Alternatively, the first lens unit L1 consists of, in order from the object side to the image side, a positive lens, a positive lens, and a negative lens. Still alternatively, the first lens unit L1 consists of, in order from the object side to the image side, a positive lens, a positive lens, a negative lens, a positive lens, and a negative lens. The second lens unit L2 consists of, in order from the object side to the image side, a negative lens and a positive lens.

Alternatively, the second lens unit L2 consists of a positive lens. The third lens unit L3 consists of, in order from the object side to the image side, a negative lens, a positive lens, and a negative lens. Alternatively, the third lens unit L3 consists of, in order from the object side to the image side, a negative lens, a negative lens, and a positive lens. Still alternatively, the third lens unit L3 consists of, in order from the object side to the image side, a positive lens and a negative lens.

In each Embodiment, a lens unit having a refractive power may be arranged between the second lens unit L2 and the third lens unit L3. When a lens unit having a positive refractive power is arranged between the second lens unit L2 and the third lens unit L3, the negative refractive power of the third lens unit L3 can be strengthened, and hence the movement amount of the third lens unit L3 for image blur correction can be small. Further, when a lens unit having a positive refractive power is arranged between the second lens unit L2 and the third lens unit L3, the positive refractive power of the second lens unit L2 can be strengthened, and hence the movement amount of the second lens unit L2 for focusing can be small.

When no lens unit is arranged between the second lens unit L2 and the third lens unit L3, the second lens unit L2 and the third lens unit L3 can be arranged closest together, and hence increase in lens effective diameter of the second lens unit L2 and the third lens unit L3 is easily reduced.

Next, referring to FIG. 29, a single-lens reflex camera system including the optical system according to an embodiment of the present invention is described below. In FIG. 29, the camera system includes a single-lens reflex camera body 10, an interchangeable lens 11 having the optical system according to the present invention mounted therein, a memory unit 12, such as a film or an image pickup element (photoelectric conversion element), configured to receive an image formed by the interchangeable lens 11, a viewfinder optical system 13 used to see the image of the object from the interchangeable lens 11, and a quick return mirror 14 configured to pivot so as to transfer the image of the object from the interchangeable lens 11 to the memory unit 12 and the viewfinder optical system 13 through switching.

By looking through a viewfinder, the image of the object is seen. The image of the object is reflected by the quick return mirror 14 and imaged on a focusing glass 15, and is inverted into an erect image by a penta prism 16. Then, the erect image is enlarged by an ocular optical system 17 to be observed. During photographing, the quick return mirror 14 pivots in a direction indicated by the arrow to form and store the image of the object in the memory unit 12. A sub-mirror 18 and a focal point detecting device 19 are also provided. Enhanced optical performance is obtained by applying the optical system of the present invention to the image pickup apparatus such as the interchangeable lens of the single-lens reflex camera in this way. The present invention can also be similarly applied to a mirrorless single-lens camera without the quick return mirror, and is not limited to the description above.

In the following, numerical value data 1 to numerical value data 9 corresponding to Embodiments 1 to 9 are shown. In each numerical value data, the order of a surface counted from the object side is represented by i. In numerical value data, a curvature radius of an i-th lens surface in the order from the object side is represented by ri, the thickness of a lens or an air interval between the i-th surface and an (i+1)th surface in the order from the object side is represented by di, and a refractive index and an Abbe number of an optical material between the i-th surface and the (i+1)th surface in the order from object side are represented by ndi and vdi, respectively. An aspherical shape satisfies the following expression when the optical axis direction is represented by the X axis, the direction vertical to the optical axis is represented by the H axis, a light travelling direction is positive, a paraxial curvature radius is represented by R, and aspherical coefficients are represented by K, A2, A4, A6, A8, and A10, respectively.

$$X = \frac{(1/R)}{1 + \sqrt{1 - (1+K)(H/R)^2}} + A_2 H^2 + A_4 H^4 + A_6 H^6 + A_8 H^8 + A_{10} H^{10}$$

In each of the aspherical coefficients, "e-x" means "×10$^{-x}$". In addition to specifications such as the focal lengths and the F-number, an angle of view is the half angle of view of the entire system, the image height is the maximum image height that determines the half angle of view, and the total lens length is a distance from the first lens surface to the image plane. Back focus BF indicates a length from the last lens surface to the image plane. Results of calculations of the conditional expressions based on lens data in numerical value data 1 to numerical value data 9 described below are shown in Table 1. The exemplary embodiments of the present invention are described above, but the present invention is not limited to those embodiments and can be modified and changed variously within the scope of the gist thereof.

Embodiment 1

| Surface number i | ri | di | ndi | vdi |
|---|---|---|---|---|
| 1 | 83.363 | 7.80 | 1.48749 | 70.2 |
| 2 | 449.970 | 0.15 | | |
| 3 | 52.309 | 11.10 | 1.49700 | 81.5 |
| 4 | 469.993 | 0.15 | | |
| 5 | 54.389 | 4.78 | 1.91082 | 35.3 |
| 6 | 84.133 | 5.53 | | |
| 7 | 257.056 | 2.40 | 1.73800 | 32.3 |
| 8 | 30.548 | 28.16 | | |
| 9 | 84.995 | 1.20 | 1.67300 | 38.1 |
| 10 | 25.353 | 6.98 | 1.76385 | 48.5 |
| 11 | 263.626 | 2.50 | | |
| 12 (Stop) | ∞ | 1.50 | | |
| 13 | 158.284 | 1.00 | 1.69350 | 53.2 |
| 14 | 39.128 | 4.29 | | |
| 15 | −58.093 | 4.89 | 1.80809 | 22.8 |
| 16 | −22.336 | 1.00 | 1.72047 | 34.7 |
| 17 | 274.565 | 8.42 | | |
| 18 | 144.993 | 7.23 | 1.58913 | 61.1 |
| 19 | −35.084 | 1.20 | 1.80518 | 25.4 |
| 20 | −57.695 | 0.54 | | |
| 21 | 99.907 | 4.21 | 1.80400 | 46.6 |
| 22 | −1041.667 | 54.00 | | |
| Image plane | ∞ | | | |

| Various data Zoom ratio 1.00 | |
|---|---|
| Focal length | 133.33 |
| F-number | 2.06 |
| Half angle of view (degree) | 9.22 |
| Image height | 21.64 |
| Total lens length | 159.02 |
| BF | 54.00 |

Embodiment 2

| Surface data | | | | |
|---|---|---|---|---|
| Surface number i | ri | di | ndi | vdi |
| 1 | 72.817 | 4.49 | 1.91082 | 35.3 |
| 2 | 188.084 | 0.15 | | |
| 3 | 34.437 | 9.01 | 1.59522 | 67.7 |
| 4 | 180.663 | 4.44 | | |
| 5 | 223.100 | 2.40 | 1.73800 | 32.3 |
| 6 | 25.883 | 16.65 | | |
| 7 | 55.885 | 1.20 | 1.76182 | 26.5 |
| 8 | 23.989 | 5.86 | 1.85150 | 40.8 |
| 9 | 163.506 | 2.50 | | |
| 10 (Stop) | ∞ | 1.50 | | |
| 11 | −335.995 | 1.00 | 1.63980 | 34.5 |
| 12 | 76.326 | 1.92 | | |
| 13 | −114.883 | 4.37 | 1.80809 | 22.8 |
| 14 | −25.404 | 1.00 | 1.67300 | 38.1 |
| 15 | 47.468 | 3.50 | | |

-continued

| | | | | |
|---|---|---|---|---|
| 16 | 70.991 | 5.64 | 1.72916 | 54.7 |
| 17 | −35.412 | 1.20 | 1.84666 | 23.8 |
| 18 | −111.302 | 8.38 | | |
| 19 | 97.200 | 3.88 | 1.84666 | 23.8 |
| 20 | −1041.667 | 39.99 | | |
| Image plane | ∞ | | | |

| | |
|---|---|
| Focal length | 98.00 |
| F-number | 2.06 |
| Half angle of view (degree) | 12.45 |
| Image height | 21.64 |
| Total lens length | 119.07 |
| BF | 39.99 |

Embodiment 3

| Surface number i | ri | di | ndi | vdi |
|---|---|---|---|---|
| 1 | 65.298 | 4.52 | 1.85150 | 40.8 |
| 2 | 114.641 | 0.15 | | |
| 3 | 48.128 | 8.40 | 1.59522 | 67.7 |
| 4 | 563.894 | 0.15 | | |
| 5 | 44.062 | 2.99 | 1.83481 | 42.7 |
| 6 | 51.161 | 3.30 | | |
| 7 | 671.489 | 1.80 | 1.63980 | 34.5 |
| 8 | 27.804 | 15.15 | | |
| 9 | 66.262 | 1.20 | 1.72825 | 28.5 |
| 10 | 23.192 | 6.44 | 1.85150 | 40.8 |
| 11 | 266.131 | 2.50 | | |
| 12 (Stop) | ∞ | 1.50 | | |
| 13 | 97.709 | 1.00 | 1.51742 | 52.4 |
| 14 | 31.177 | 4.35 | | |
| 15 | −44.176 | 4.60 | 1.80809 | 22.8 |
| 16 | −21.698 | 1.00 | 1.62004 | 36.3 |
| 17 | 81.987 | 2.73 | | |
| 18 | 70.211 | 8.51 | 1.72916 | 54.7 |
| 19 | −25.271 | 1.20 | 1.90366 | 31.3 |
| 20 | −65.965 | 4.44 | | |
| 21 | 87.994 | 4.20 | 1.85150 | 40.8 |
| 22 | −1041.667 | 37.99 | | |
| Image plane | ∞ | | | |

| | |
|---|---|
| Focal length | 84.00 |
| F-number | 1.86 |
| Half angle of view (degree) | 14.44 |
| Image height | 21.64 |
| Total lens length | 118.11 |
| BF | 37.99 |

Embodiment 4

| Surface number i | ri | di | ndi | vdi |
|---|---|---|---|---|
| 1 | 69.898 | 5.50 | 2.00100 | 29.1 |
| 2 | 121.347 | 0.15 | | |
| 3 | 60.105 | 9.32 | 1.43875 | 94.9 |
| 4 | 444.575 | 0.15 | | |
| 5 | 54.868 | 4.17 | 1.76385 | 48.5 |
| 6 | 78.619 | 2.65 | | |
| 7 | 230.427 | 1.80 | 1.73800 | 32.3 |
| 8 | 34.710 | 18.99 | | |
| 9 | 67.494 | 1.20 | 1.76182 | 26.5 |
| 10 | 27.221 | 9.15 | 1.85150 | 40.8 |
| 11 | 273.577 | 2.50 | | |
| 12 (Stop) | ∞ | 1.50 | | |
| 13 | 251.300 | 1.00 | 1.76182 | 26.5 |
| 14 | 39.817 | 5.93 | | |
| 15 | −58.186 | 1.00 | 1.65412 | 39.7 |
| 16 | 46.779 | 5.20 | 1.92286 | 20.9 |
| 17 | −357.384 | 1.24 | | |

-continued

| | | | | |
|---|---|---|---|---|
| 18 | 99.843 | 8.01 | 1.49700 | 81.5 |
| 19 | -33.678 | 1.20 | 1.69895 | 30.1 |
| 20 | 45.038 | 4.34 | 1.91082 | 35.3 |
| 21 | 186.083 | 0.73 | | |
| 22 | 138.779 | 7.29 | 2.00100 | 29.1 |
| 23 | -39.345 | 1.40 | 1.68893 | 31.1 |
| 24 | 33.729 | 8.54 | 1.83220 | 40.1 |
| 25* | -224.480 | 37.99 | | |
| Image plane | ∞ | | | |

Aspherical surface data
Twenty-fifth surface

K = 3.52232e+001   A4 = 3.14560e-006   A6 = 1.32292e-009
A8 = -1.17149e-012  A10 = 1.73525e-015

| | |
|---|---|
| Focal length | 84.00 |
| F-number | 1.45 |
| Half angle of view (degree) | 14.44 |
| Image height | 21.64 |
| Total lens length | 140.95 |
| BF | 37.99 |

Embodiment 5

| Surface number i | ri | di | ndi | νdi |
|---|---|---|---|---|
| 1 | 199.824 | 8.43 | 1.48749 | 70.2 |
| 2 | 1198.093 | 0.15 | | |
| 3 | 85.877 | 21.74 | 1.43875 | 94.9 |
| 4 | -442.638 | 10.04 | | |
| 5 | -365.863 | 2.40 | 1.67003 | 47.2 |
| 6 | 259.063 | 38.82 | | |
| 7 | 68.899 | 7.73 | 2.00100 | 29.1 |
| 8 | 352.468 | 0.76 | | |
| 9 | 620.960 | 2.40 | 1.73800 | 32.3 |
| 10 | 42.140 | 23.39 | | |
| 11 | 59.080 | 1.20 | 1.57501 | 41.5 |
| 12 | 28.430 | 11.48 | 1.58913 | 61.1 |
| 13 | 195.411 | 9.57 | | |
| 14 (Stop) | ∞ | 1.50 | | |
| 15 | 474.739 | 1.00 | 1.83481 | 42.7 |
| 16 | 54.044 | 4.63 | | |
| 17 | -72.446 | 5.38 | 1.80809 | 22.8 |
| 18 | -27.587 | 1.00 | 1.73800 | 32.3 |
| 19 | 184.441 | 2.32 | | |
| 20 | 100.789 | 8.01 | 1.48749 | 70.2 |
| 21 | -36.562 | 1.20 | 1.80518 | 25.5 |
| 22 | -55.807 | 33.25 | | |
| 23 | 143.591 | 9.67 | 1.84666 | 23.8 |
| 24 | -1039.960 | 77.08 | | |
| Image plane | ∞ | | | |

| | |
|---|---|
| Focal length | 290.90 |
| F-number | 2.88 |
| Half angle of view (degree) | 4.25 |
| Image height | 21.64 |
| Total lens length | 283.15 |
| BF | 77.08 |

Embodiment 6

| Surface number i | ri | di | ndi | νdi |
|---|---|---|---|---|
| 1 | 141.813 | 4.48 | 1.48749 | 70.2 |
| 2 | 491.458 | 0.15 | | |
| 3 | 56.484 | 10.55 | 1.49700 | 81.5 |
| 4 | 381.471 | 0.15 | | |
| 5 | 54.999 | 5.71 | 1.91082 | 35.3 |
| 6 | 96.809 | 5.85 | | |
| 7 | 190.264 | 2.40 | 1.73800 | 32.3 |
| 8 | 33.171 | 30.83 | | |
| 9 | 102.541 | 1.20 | 1.62588 | 35.7 |
| 10 | 31.268 | 6.83 | 1.77250 | 49.6 |
| 11 | 269.228 | 3.57 | | |
| 12 (Stop) | ∞ | 1.50 | | |
| 13 | 65.441 | 3.43 | 1.88300 | 40.8 |
| 14 | 246.305 | 2.00 | | |
| 15 | 168.998 | 1.00 | 1.88300 | 40.8 |
| 16 | 32.232 | 5.22 | | |
| 17 | -40.462 | 5.07 | 1.80809 | 22.8 |
| 18 | -18.896 | 1.00 | 1.72047 | 34.7 |
| 19 | 114.908 | 2.46 | | |
| 20 | 83.409 | 9.28 | 1.60311 | 60.6 |
| 21 | -24.529 | 1.20 | 1.84666 | 23.8 |
| 22 | -40.723 | 0.15 | | |
| 23 | 104.186 | 4.12 | 1.84666 | 23.9 |
| 24 | -900.150 | 53.95 | | |
| Image plane | ∞ | | | |

| | |
|---|---|
| Focal length | 133.33 |
| F-number | 2.06 |
| Half angle of view (degree) | 9.22 |
| Image height | 21.64 |
| Total lens length | 162.10 |
| BF | 53.95 |

Embodiment 7

| Surface number i | ri | di | ndi | νdi |
|---|---|---|---|---|
| 1 | 78.278 | 8.01 | 1.90366 | 31.3 |
| 2 | 441.653 | 1.34 | | |
| 3 | 46.025 | 6.32 | 1.59522 | 67.7 |
| 4 | 91.001 | 1.93 | | |
| 5 | 167.029 | 1.80 | 1.65412 | 39.7 |
| 6 | 34.648 | 5.17 | | |
| 7 | 83.439 | 8.80 | 1.59522 | 67.7 |
| 8 | -63.374 | 1.80 | 1.65412 | 39.7 |
| 9 | 68.327 | 14.73 | | |
| 10 | 73.217 | 1.20 | 1.75520 | 27.5 |
| 11 | 26.079 | 9.93 | 1.85150 | 40.8 |
| 12 | 1003.533 | 2.50 | | |
| 13 (Stop) | ∞ | 1.50 | | |
| 14 | 221.064 | 1.00 | 1.74000 | 28.3 |
| 15 | 36.374 | 5.92 | | |
| 16 | -62.993 | 1.00 | 1.65412 | 39.7 |
| 17 | 39.204 | 4.79 | 1.92286 | 20.9 |
| 18 | 233.209 | 2.00 | | |
| 19 | 51.629 | 8.16 | 1.49700 | 81.5 |
| 20 | -46.493 | 1.20 | 1.74077 | 27.8 |
| 21 | 35.301 | 6.34 | 1.91082 | 35.3 |
| 22 | 165.220 | 0.23 | | |
| 23 | 103.224 | 7.51 | 2.00100 | 29.1 |
| 24 | -55.857 | 1.40 | 1.59270 | 35.3 |
| 25 | 44.648 | 6.71 | 1.83220 | 40.1 |
| 26* | -630.797 | 37.97 | | |
| Image plane | ∞ | | | |

Aspherical surface data
Twenty-sixth surface

K = -3.10292e+002   A4 = 3.88746e-006   A6 = 2.10533e-009
A8 = -1.64144e-012  A10 = 4.30538e-015

| | |
|---|---|
| Focal length | 82.90 |
| F-number | 1.45 |
| Half angle of view (degree) | 10.26 |
| Image height | 15.00 |
| Total lens length | 150.79 |
| BF | 37.97 |

Embodiment 8

| Unit mm | | | | |
|---|---|---|---|---|
| Surface data | | | | |
| Surface number i | ri | di | ndi | vdi |
| 1 | 91.265 | 7.42 | 1.59270 | 35.3 |
| 2 | 653.117 | 0.15 | | |
| 3 | 51.322 | 6.97 | 1.72916 | 54.7 |
| 4 | 110.069 | 3.93 | | |
| 5 | 145.278 | 1.80 | 1.65412 | 39.7 |
| 6 | 35.535 | 5.09 | | |
| 7 | 78.889 | 7.48 | 1.59522 | 67.7 |
| 8 | −122.377 | 1.20 | 1.65412 | 39.7 |
| 9 | 163.380 | 18.44 | | |
| 10 | 133.860 | 1.20 | 1.69895 | 30.1 |
| 11 | 29.462 | 8.54 | 1.85150 | 40.8 |
| 12 | 376.721 | 2.49 | | |
| 13 (Stop) | ∞ | 1.50 | | |
| 14 | 242.353 | 1.00 | 1.72825 | 28.5 |
| 15 | 36.565 | 6.41 | | |
| 16 | −57.835 | 1.00 | 1.59551 | 39.2 |
| 17 | 42.485 | 5.49 | 1.92286 | 20.9 |
| 18 | −947.299 | 2.00 | | |
| 19 | 64.985 | 7.90 | 1.80400 | 46.6 |
| 20 | −45.493 | 1.20 | 1.85478 | 24.8 |
| 21 | 133.263 | 1.73 | | |
| 22 | 440.703 | 6.19 | 1.91082 | 35.3 |
| 23 | −42.161 | 1.40 | 1.59270 | 35.3 |
| 24 | 39.851 | 7.24 | 1.83220 | 40.1 |
| 25* | −350.280 | −0.05 | | |
| 26 | ∞ | 38.18 | | |
| Image plane | ∞ | | | |

Aspherical surface data
Twenty-fifth surface $K = 1.71721\mathrm{e}+002$   $A4 = 3.27270\mathrm{e}{-006}$   $A6 = -2.07042\mathrm{e}{-010}$
$A8 = 4.15642\mathrm{e}{-012}$   $A10 = -3.82721\mathrm{e}{-015}$

| | |
|---|---|
| Focal length | 82.88 |
| F-number | 1.45 |
| Half angle of view (degree) | 14.63 |

Embodiment 9

| Surface number i | ri | di | ndi | vdi |
|---|---|---|---|---|
| 1 | 34.273 | 6.04 | 1.69680 | 55.5 |
| 2 | 1826.364 | 0.15 | | |
| 3 | 30.464 | 3.08 | 1.77250 | 49.6 |
| 4 | 49.464 | 2.74 | | |
| 5 | 657.299 | 1.20 | 1.72151 | 29.2 |
| 6 | 19.848 | 9.72 | | |
| 7 | 26.307 | 3.42 | 1.69680 | 55.5 |
| 8 | −1022.910 | 1.85 | | |
| 9 (Stop) | ∞ | 2.15 | | |
| 10 | 2435.118 | 0.80 | 1.48749 | 70.2 |
| 11 | 27.805 | 3.89 | | |
| 12 | −35.291 | 2.11 | 1.92286 | 20.9 |
| 13 | −18.463 | 0.80 | 1.56732 | 42.8 |
| 14 | 30.158 | 2.88 | | |
| 15 | 23.307 | 9.52 | 1.49700 | 81.5 |
| 16 | −14.956 | 1.00 | 1.85478 | 24.8 |
| 17 | −42.640 | 0.15 | | |
| 18 | 46.598 | 6.33 | 1.90366 | 31.3 |
| 19 | −37.059 | 5.81 | | |
| 20 | −20.510 | 1.00 | 1.72825 | 28.5 |
| 21 | −196.162 | 9.99 | | |
| Image plane | ∞ | | | |

| | |
|---|---|
| Focal length | 50.19 |
| F-number | 1.86 |
| Half angle of view (degree) | 10.83 |
| Image height | 9.60 |
| Total lens length | 74.61 |
| BF | 9.99 |

TABLE 1

| | | Embodiment | | | | | | | | |
|---|---|---|---|---|---|---|---|---|---|---|
| | | 1 | 2 | 3 | 4 | 5 | 6 | 7 | 8 | 9 |
| Conditional Expression (1) | D3/f | 0.651 | 0.723 | 0.833 | 0.998 | 0.493 | 0.626 | 1.016 | 0.962 | 0.789 |
| Conditional Expression (2) | D23/f | 0.030 | 0.026 | 0.048 | 0.048 | 0.038 | 0.079 | 0.048 | 0.048 | 0.173 |
| Conditional Expression (3) | D12/f | 0.211 | 0.170 | 0.180 | 0.226 | 0.080 | 0.231 | 0.178 | 0.223 | 0.194 |
| Conditional Expression (4) | f1/f | 1.511 | 2.380 | 2.947 | 3.585 | 1.139 | 1.738 | 5.212 | 2.491 | 5.083 |
| Conditional Expression (5) | f2/f | 0.859 | 0.819 | 0.897 | 1.018 | 0.461 | 0.934 | 0.914 | 1.465 | 0.734 |
| Conditional Expression (6) | f3/f | −0.283 | −0.378 | −0.407 | −0.628 | −0.126 | −0.161 | −0.476 | −0.654 | −0.774 |
| Conditional Expression (7) | f3/f4 | −0.766 | −0.828 | −0.886 | −1.086 | −0.537 | −0.566 | −0.982 | −1.157 | −1.508 |
| Conditional Expression (8) | β2 | 0.519 | 0.351 | 0.313 | 0.292 | 0.458 | 0.481 | 0.205 | 0.464 | 0.170 |
| Conditional Expression (9) | $1/\beta 3^2$ | 0.017 | 0.007 | 0.024 | 0.005 | 0.089 | 0.079 | 0.039 | 0.000 | 0.002 |
| Conditional Expression (10) | D3/L | 0.546 | 0.595 | 0.593 | 0.595 | 0.507 | 0.515 | 0.559 | 0.541 | 0.531 |

-continued

| Unit mm | |
|---|---|
| Image height | 21.64 |
| Total lens length | 147.40 |
| BF | 38.18 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-002448, filed Jan. 8, 2016, which is hereby incorporated by reference herein in its entirety.

What is claimed is:

1. An optical system, comprising, in order from an object side to an image side:
   a first lens unit having a positive refractive power;
   a second lens unit having a positive refractive power;
   a third lens unit having a negative refractive power; and
   a fourth lens unit having a positive refractive power,
   wherein the second lens unit is moved in a direction of an optical axis of the optical system during focusing,
   wherein the third lens unit is moved, during image blur correction, in a direction having a vertical direction component with respect to the optical axis,
   wherein the first lens unit consists of five or less lens elements,
   wherein the third lens unit consists of, in order from the object side to the image side, a negative lens, a negative lens, and a positive lens, and
   wherein the following conditional expression is satisfied:

$0.30 < D3/f < 1.30$, where D3 represents a distance on the optical axis from a lens surface closest to the object side of the third lens unit to an image plane, and f represents a focal length of the optical system.

2. An optical system according to claim 1, wherein the following conditional expression is satisfied:

$0.01 < D23/f < 0.20$, where D23 represents a distance on the optical axis from a lens surface closest to the image side of the second lens unit to the lens surface closest to the object side of the third lens unit when focusing on infinity.

3. An optical system according to claim 1, wherein the following conditional expression is satisfied:

$0.043 < D12/f < 0.300$, where D12 represents a distance on the optical axis from a lens surface closest to the image side of the first lens unit to a lens surface closest to the object side of the second lens unit when focusing on infinity.

4. An optical system according to claim 1, wherein the following conditional expression is satisfied:

$1.00 < f1/f < 7.00$, where f1 represents a focal length of the first lens unit.

5. An optical system according to claim 1, wherein the following conditional expression is satisfied:

$0.27 < f2/f < 2.00$, where f2 represents a focal length of the second lens unit.

6. An optical system according to claim 1, wherein the following conditional expression is satisfied:

$0.05 \leq \beta2 < 0.70$, where $\beta2$ represents a lateral magnification of the second lens unit when focusing on infinity.

7. An optical system according to claim 6, wherein the following conditional expression is satisfied:

$1/\beta3^2 < 0.20$, where $\beta3$ represents a lateral magnification of the third lens unit when focusing on infinity.

8. An optical system according to claim 1, wherein the following conditional expression is satisfied:

$0.4 < D3/L < 0.7$, where L represents a distance on the optical axis from a lens surface vertex on the object side of a lens arranged closest to the object side to the image plane.

9. An optical system according to claim 1, wherein the first lens unit consists of, in order from the object side to the image side, a positive lens, a positive lens, a positive lens, and a negative lens.

10. An optical system according to claim 1, wherein the third lens unit consists of, in order from the object side to the image side, a negative lens, a negative lens, and a positive lens.

11. An optical system according to claim 1, wherein the second lens unit consists of, in order from the object side to the image side, a negative lens and a positive lens.

12. An image pickup apparatus, comprising:
    an optical system according to claim 1; and
    an image pickup element configured to receive an image formed by the optical system.

13. An optical system according to claim 1, further comprising a positive lens or negative lens arranged between the second lens unit and the third lens unit.

14. An optical system according to claim 1, further comprising an aperture stop arranged between the second lens unit and the third lens unit.

15. An optical system according to claim 1,
    wherein the following conditional expressions are satisfied:

$-0.80 < f3/f < -0.1$, and $0.5 < D3/L < 0.7$, where f3 represents a focal length of the third lens unit, and L represents a distance on the optical axis from a lens surface vertex on the object side of a lens arranged closest to the object side to the image plane.

* * * * *